US010759351B2

(12) United States Patent
Westcott

(10) Patent No.: US 10,759,351 B2
(45) Date of Patent: Sep. 1, 2020

(54) MULTIPURPOSE SWING ARM ASSEMBLY OF A VEHICLE ACCESSORY RACK

(71) Applicant: Westcott Designs Inc., Cave Creek, AZ (US)

(72) Inventor: Jeffrey Richard Westcott, Cave Creek, AZ (US)

(73) Assignee: Westcott Designs, Inc., Cave Creek, AZ (US)

( * ) Notice: Subject to any disclaimer, the term of this patent is extended or adjusted under 35 U.S.C. 154(b) by 0 days.

(21) Appl. No.: 16/408,191

(22) Filed: May 9, 2019

(65) Prior Publication Data
US 2020/0047681 A1   Feb. 13, 2020

Related U.S. Application Data

(60) Provisional application No. 62/715,657, filed on Aug. 7, 2018, provisional application No. 62/838,601, filed on Apr. 25, 2019.

(51) Int. Cl.
*B60R 9/00*       (2006.01)
*B60R 9/06*       (2006.01)
(Continued)

(52) U.S. Cl.
CPC .................. *B60R 9/06* (2013.01); *B60D 1/24* (2013.01); *B60D 1/52* (2013.01)

(58) Field of Classification Search
CPC ................ B60R 9/06; B60D 1/24; B60D 1/52
(Continued)

(56) References Cited

U.S. PATENT DOCUMENTS 3,194,467 A    7/1965  Goonan et al.
3,658,201 A *  4/1972  Williams .................. B60R 9/06
                                                      414/466
(Continued)

FOREIGN PATENT DOCUMENTS

CN       206406843 U    8/2017
DE    202016105755 U1   2/2018
EP         1008491 B1   11/1999

OTHER PUBLICATIONS

Aluminess Products, Inc., Ford Econoline Van Rear Bumper for 2008-2014, https://www.aluminess.com/ford/ford-vans-2008-2013/rear-bumper/, Jan. 9, 2019, Aluminess Products, Inc., United States.

*Primary Examiner* — Peter N Helvey
(74) *Attorney, Agent, or Firm* — Schmeiser, Olsen & Watts LLP

(57) ABSTRACT

A multipurpose swing arm assembly for a vehicle accessory rack is described. The accessory rack includes a base rack that holds the multipurpose swing arm assembly, and a coupling assembly that couples the base rack and the multipurpose swing arm assembly to a hitch coupler of the vehicle. The multipurpose swing arm assembly is used to hold accessories for transported and use with the vehicle. The multipurpose swing arm assembly includes a multipurpose swing rod hingedly coupled to the base rack, and two cooler tray support rods. A cooler tray is coupled to the cooler tray support rods. A cooler is set on the cooler tray and coupled to the multipurpose swing arm assembly to be transported and used with the vehicle. A work top bar and a work top can also be coupled to the multipurpose swing rod to be used as a table top.

20 Claims, 13 Drawing Sheets

(51) Int. Cl.
  *B60D 1/24* (2006.01)
  *B60D 1/52* (2006.01)
(58) Field of Classification Search
  USPC .......................................................... 224/509
  See application file for complete search history.

(56) References Cited

U.S. PATENT DOCUMENTS

| | | | |
|---|---|---|---|
| 4,282,994 A | 8/1981 | Hilliard | |
| 5,094,373 A | 3/1992 | Lovci | |
| 5,244,133 A | 9/1993 | Abbott et al. | |
| 5,333,888 A | 8/1994 | Ball | |
| 5,423,566 A | 6/1995 | Warrington et al. | |
| 5,439,151 A * | 8/1995 | Clayton | B60R 9/065 224/282 |
| 5,518,159 A | 5/1996 | DeGuevara | |
| 5,538,168 A | 7/1996 | Burger | |
| 5,544,799 A * | 8/1996 | Didlake | B60R 9/06 224/282 |
| 5,685,686 A | 11/1997 | Burns | |
| 5,806,736 A * | 9/1998 | Kincart | B62D 43/02 224/42.13 |
| 5,842,615 A | 12/1998 | Goodness | |
| 5,884,826 A | 3/1999 | Shaver | |
| 5,950,617 A * | 9/1999 | Lorenz | B60R 9/06 108/44 |
| 6,105,989 A | 8/2000 | Linger | |
| 6,164,508 A | 12/2000 | van Veenen | |
| 6,189,754 B1 * | 2/2001 | Cutajar | B60R 9/06 224/519 |
| 6,237,823 B1 * | 5/2001 | Stewart | B60R 9/065 224/282 |
| 6,386,410 B1 * | 5/2002 | Van Dusen | B60R 9/06 224/509 |
| 6,701,913 B1 * | 3/2004 | LeDuc | B60R 9/06 126/276 |
| 6,835,021 B1 | 12/2004 | McMillan | |
| D505,649 S * | 5/2005 | Kenney | D12/202 |
| 6,923,351 B2 * | 8/2005 | Roehmer | B60R 11/06 224/42.21 |
| 7,281,646 B2 * | 10/2007 | Flannery | B60R 9/06 126/276 |
| 7,448,640 B2 | 11/2008 | Weaver | |
| 7,591,404 B2 * | 9/2009 | LeDuc | B60R 9/06 126/276 |
| 7,810,439 B2 | 10/2010 | Bless | |
| 7,823,904 B2 | 11/2010 | Coy | |
| 8,262,121 B2 | 9/2012 | Beck | |
| 8,419,041 B2 | 4/2013 | Bessette et al. | |
| 8,944,516 B2 | 2/2015 | Eidsmore | |
| 9,421,836 B1 | 8/2016 | Ford et al. | |
| 9,475,353 B2 * | 10/2016 | Mehlen | B60R 9/065 |
| 9,586,450 B2 | 3/2017 | Ford | |
| 10,479,284 B1 * | 11/2019 | Salyer | B60R 9/06 |
| 10,661,845 B2 * | 5/2020 | Wymore | B62D 43/02 |
| 2002/0043259 A1 * | 4/2002 | Brennan | B66F 7/0625 126/41 R |
| 2002/0171226 A1 | 11/2002 | McCoy et al. | |
| 2004/0150189 A1 | 8/2004 | Deanda | |
| 2006/0151555 A1 * | 7/2006 | Mills | B60R 9/06 224/509 |
| 2010/0176170 A1 * | 7/2010 | O'Hare | B60R 9/06 224/519 |
| 2011/0278336 A1 | 11/2011 | Landrum | |
| 2012/0292357 A1 | 11/2012 | Tennyson | |
| 2015/0115010 A1 | 4/2015 | Ziola | |
| 2018/0265014 A1 | 9/2018 | Phillips | |

\* cited by examiner

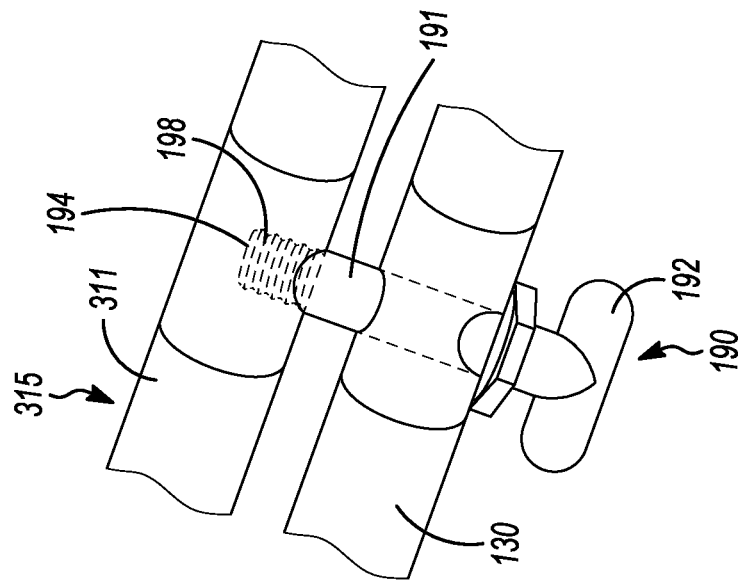
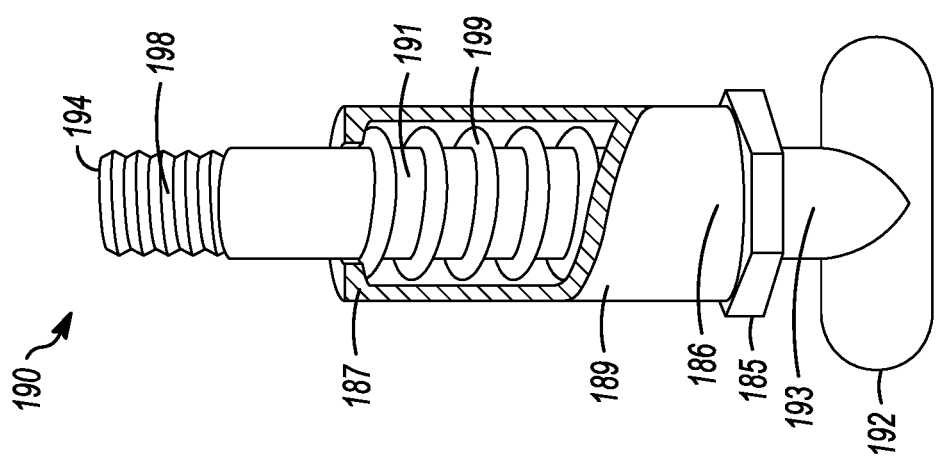
FIG. 13
FIG. 12

MULTIPURPOSE SWING ARM ASSEMBLY OF A VEHICLE ACCESSORY RACK

CROSS REFERENCE TO RELATED APPLICATIONS

This invention claims priority to U.S. provisional patent application Ser. No. 62/715,657, filed Aug. 7, 2018 to Applicant Jeffrey Richard Westcott, and entitled "Tire Rack Assembly", and U.S. provisional patent application Ser. No. 62/838,601, filed Apr. 25, 2019 to Applicant Jeffrey Richard Westcott and entitled "Multipurpose Swing Arm Assembly of a Vehicle Accessory Rack", both of which are incorporated entirely herein by reference. This application incorporates entirely herein by reference U.S. patent application Ser. No. 16/365,432 filed Mar. 26, 2019 and entitled "Hitch Coupling Assembly for Coupling an Accessory to a Vehicle", and U.S. patent application Ser. No. 16/365,512 filed Mar. 26, 2019 and entitled "Accessory Rack for a Vehicle".

BACKGROUND OF THE INVENTION

Technical Field

This invention relates to accessory racks for vehicles, and specifically to a swing arm assembly that couples to an accessory rack on a vehicle and that carries a cooler and a work top for use with the vehicle.

State of the Art

Vehicle owners often mount accessories to the outside of their vehicles to store and transport items that they cannot, or do not wish to, carry inside the vehicle. It is often desirable to mount accessories on the rear side of a vehicle, especially with trucks and sport utility vehicles. Users often want to carry different accessories on their vehicles at different times. It may be desirable to have an accessory rack that can carry either a cooler or a spare tire.

Accordingly, what is needed is an accessory rack with removable and configurable swing arms, and a swing arm that can carry a spare tire or a cooler.

BRIEF DESCRIPTION OF THE DRAWINGS

FIG. 12 shows a cutaway view of a locking pin of the vehicle accessory rack of FIG. 3;

FIG. 13 shows a close-up view of a locking pin locking a multipurpose swing rod to an upper support rod of the vehicle accessory rack of FIG. 3.

DETAILED DESCRIPTION OF EMBODIMENTS OF THE INVENTION

As discussed above, embodiments of the present invention relate to accessory racks for vehicles, and specifically to a multipurpose swing arm assembly of a vehicle accessory rack. The multipurpose swing arm assembly is configurable to carry a cooler and/or a work top for use with the vehicle, or to carry a spare tire of the vehicle.

Accessory racks are commonly used on the exterior of vehicles to carry accessories. An accessory rack is often coupled to the rear of a vehicle to carry spare tires, bicycles, spare fuel tanks, and other accessories. Described herein is an accessory rack for a vehicle that is configurable to carry different accessories by using removable swing arms. A multipurpose swing arm assembly of the accessory rack can be used to carry a cooler and/or a work top, or a spare tire. The disclosed accessory rack for a vehicle is conveniently carried at the rear of the vehicle, with two removable swing arm assemblies that each carry accessories.

The accessory rack for a vehicle includes a base rack, a hitch coupling assembly, a multipurpose swing arm assembly, and a tire holder swing arm assembly. In some embodiments, the accessory rack for a vehicle uses only one swing arm assembly, either the multipurpose swing arm assembly or the tire holder swing arm assembly. The hitch coupling assembly couples the base rack to the hitch receiver of a vehicle. Each swing arm assembly is hingedly and removably coupled to the base rack. Each swing arm assembly is configured to carry different accessories. The multipurpose swing arm assembly can be configured to carry a cooler tray, a cooler, and a work top in one configuration. In another configuration, the multipurpose swing arm assembly carries a spare tire by removing the cooler and cooler tray and coupling a spare tire to the multipurpose swing arm assembly. A tire holder swing arm assembly of the accessory rack is configured to carry a spare tire. Accessories are mounted side-by-side on the swing arm assemblies, which keeps the center of gravity low and minimizes blockage of the rear window of the vehicle. The swing arm assemblies are interchangeable, with different swing arm assemblies designed to hold different accessories. The accessory rack for a vehicle is easily installed and removed from the vehicle, and easily carries a variety of accessories.

Figure 1:
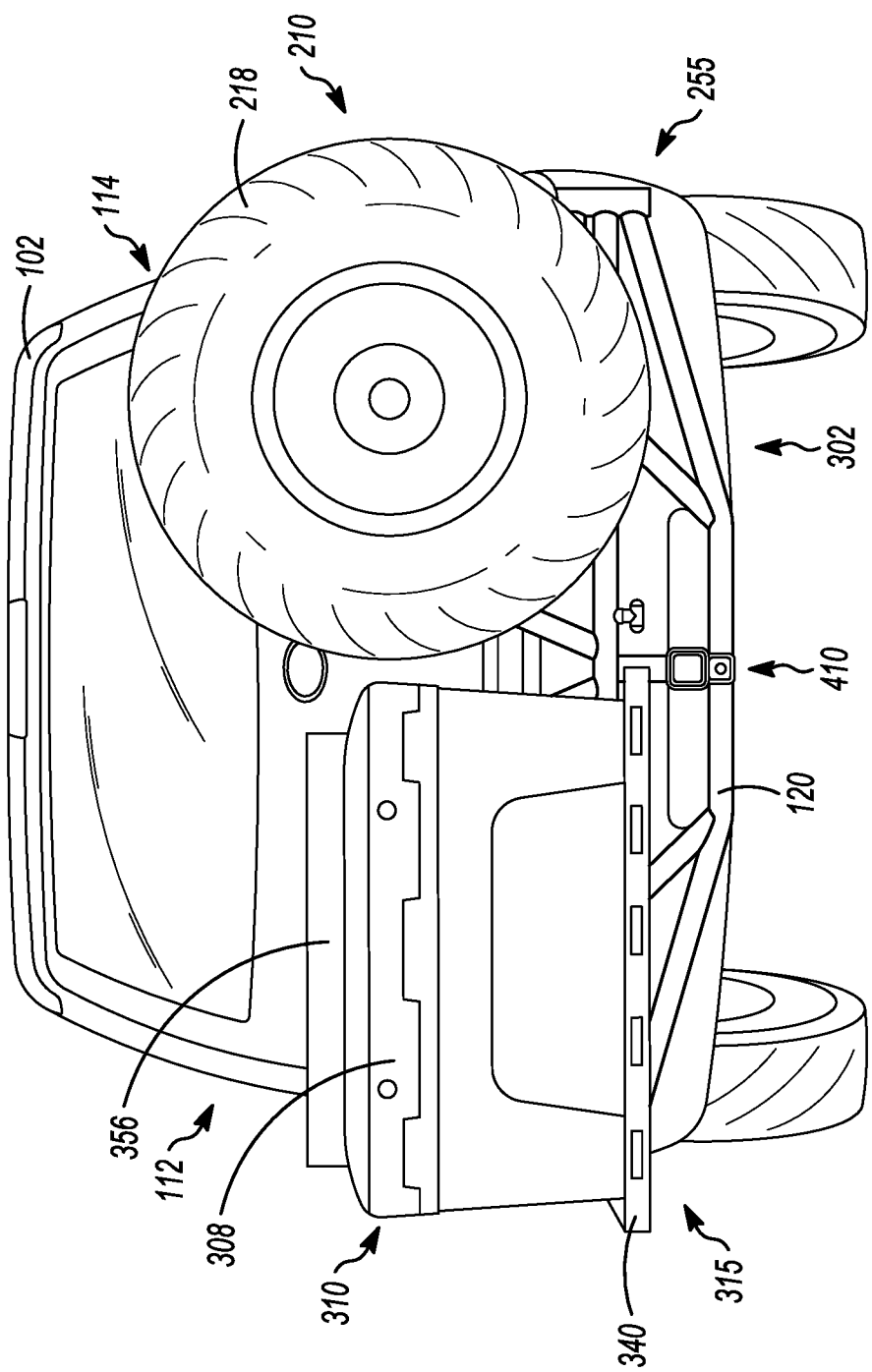
FIG. 1 shows a vehicle accessory rack mounted to a rear side of a vehicle, with a cooler and a spare tire attached to the accessory rack.
Figure 2:
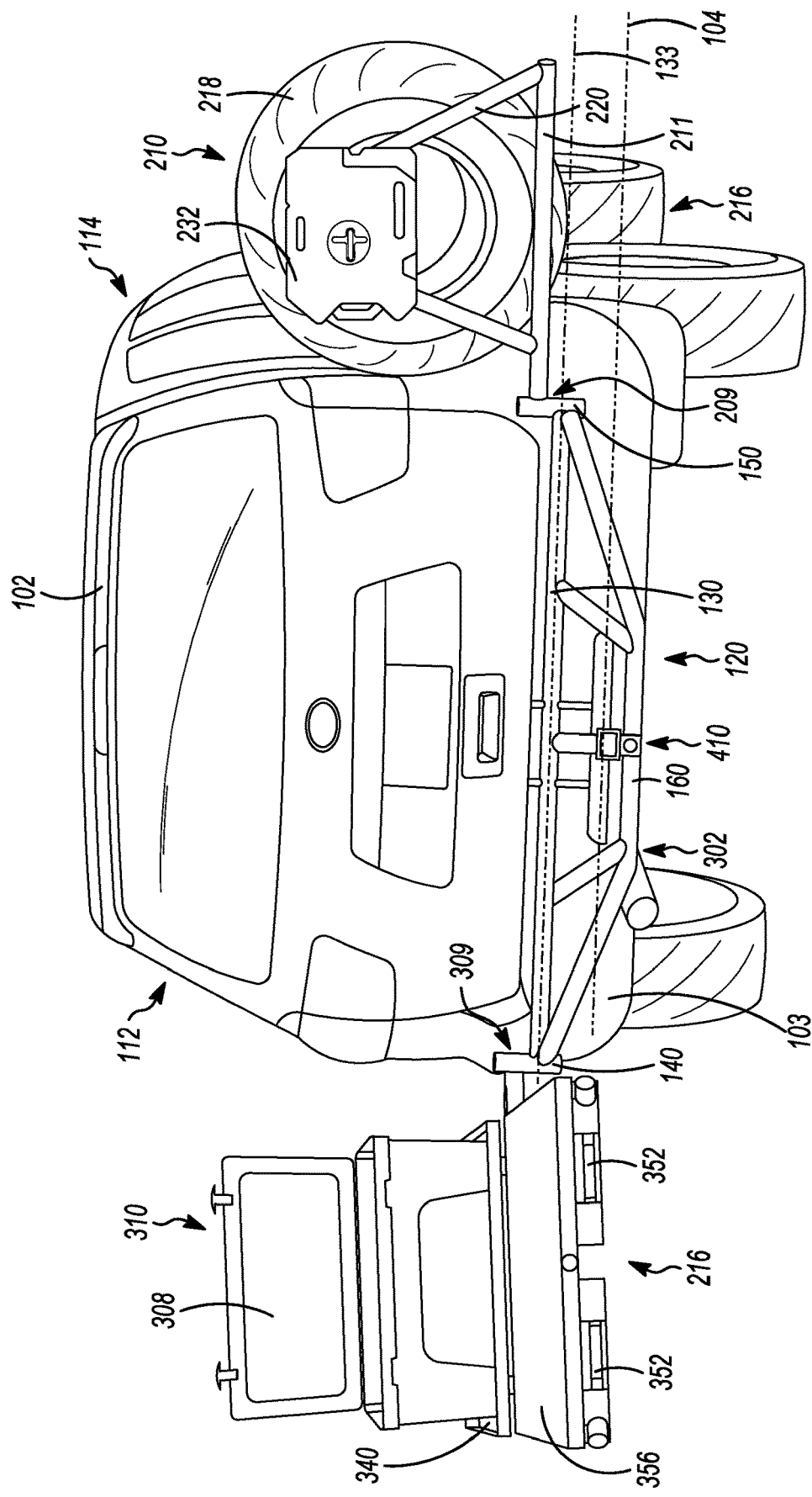
FIG. 2 shows the vehicle accessory rack mounted to a vehicle of FIG. 1, with two swing arm assemblies of the accessory rack swung out away from the vehicle.

FIG. 1 and FIG. 2 show an accessory rack 302 coupled to a vehicle 102. Accessory rack 302 includes a base rack 120, a coupling assembly 410, a multipurpose swing arm assembly 310, and a tire holder swing arm assembly 210. In some embodiments of accessory rack 302, accessory rack 302 includes only multipurpose swing arm assembly 310, without tire holder swing arm assembly 210. In some embodiments, accessory rack 302 includes only tire holder swing arm assembly 210, without multipurpose swing arm assembly 310. FIG. 1 and FIG. 2 show accessory rack 302 coupled to vehicle 102, with multipurpose swing arm assembly 310 carrying a cooler 308 on a cooler tray 340, a work top 356, and two fluid storage containers 352. Accessory rack 302 also includes tire holder swing arm assembly 210 carrying a spare tire 218 and a spare fuel tank 232. FIG. 1 shows multipurpose swing arm assembly 310 in a multipurpose swing arm assembly stored position 315, and tire holder swing arm assembly 210 in a tire holder swing arm assembly stored position 255. FIG. 2 shows both multipurpose swing arm assembly 310 and tire holder swing arm assembly 210 in an open position 216.

Accessory rack 302 is coupled to vehicle 102 using coupling assembly 410. Base rack 120 of accessory rack 302 is coupled to coupling assembly 410. Both multipurpose swing arm assembly 310 and tire holder swing arm assembly 210 are coupled to base rack 120. Coupling assembly 410 is coupled to hitch receiver 108 of vehicle 102 to couple accessory rack 302 to vehicle 102, as shown in FIG. 5.

Figure 3:
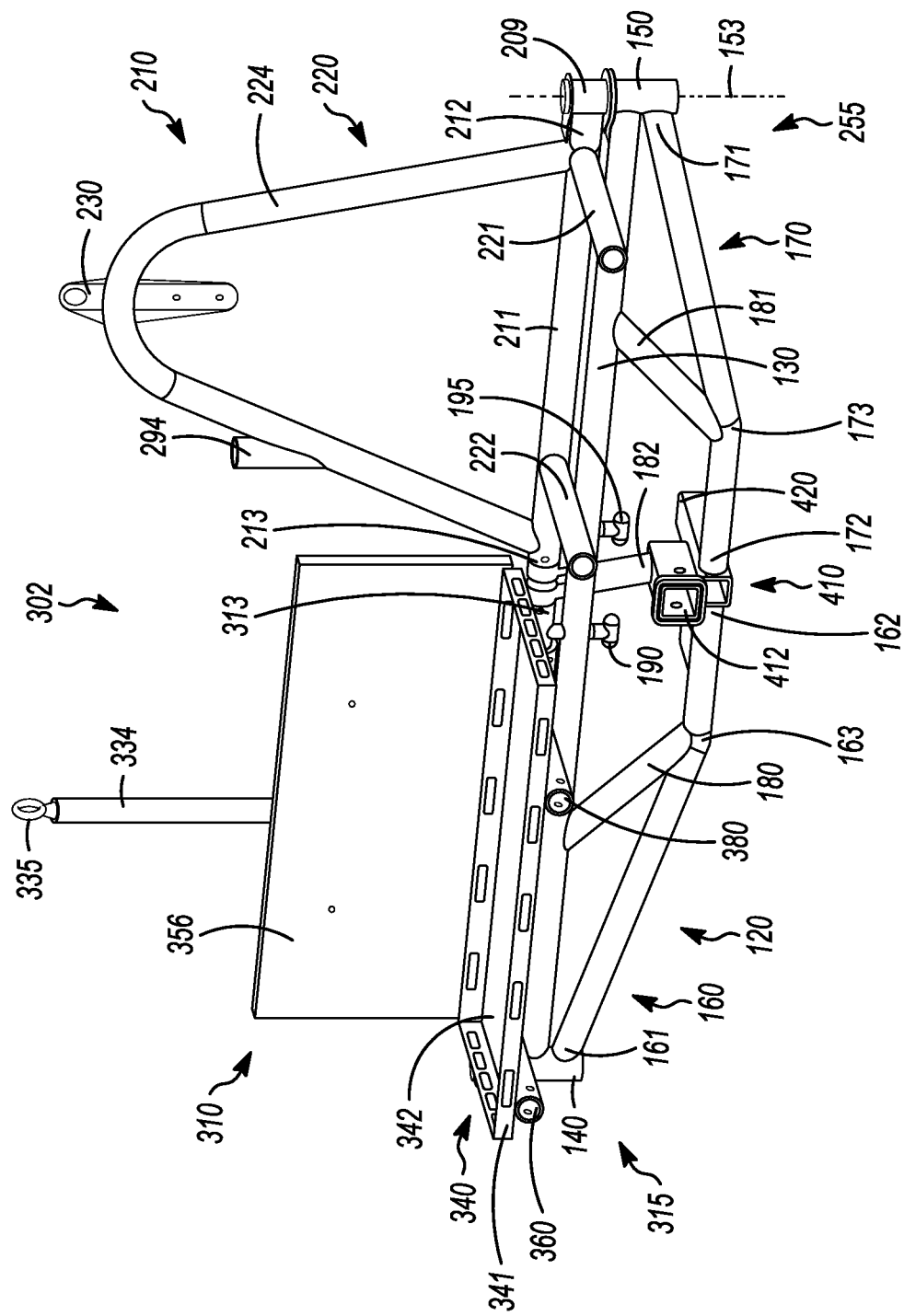
FIG. 3 shows a front view of a vehicle accessory rack.
Figure 4:
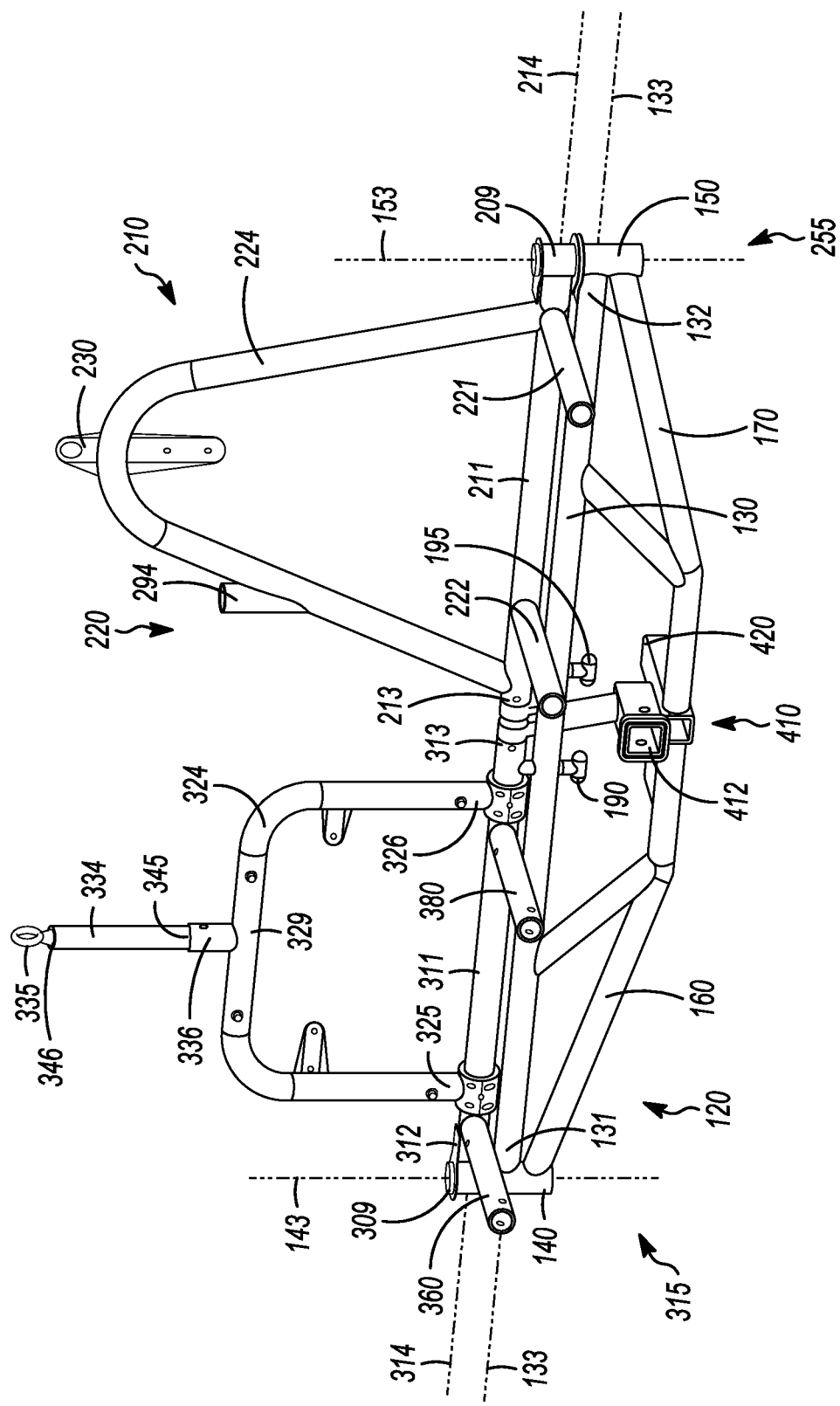
FIG. 4 shows a front perspective view of the vehicle accessory rack of FIG. 3, with a cooler tray and a work top removed from the vehicle accessory rack.
Figure 5:
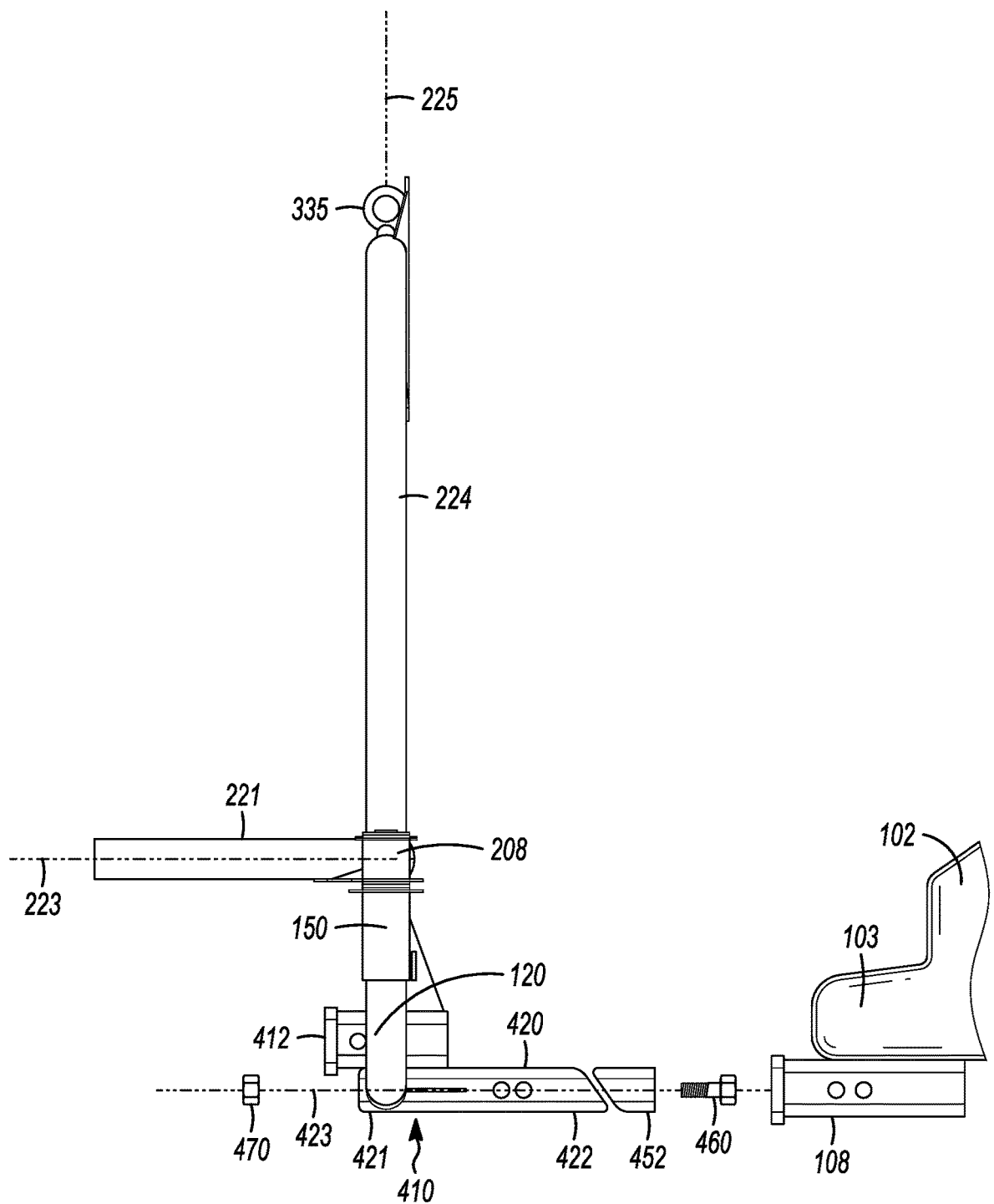
FIG. 5 shows a side perspective view of the vehicle accessory rack of FIG. 3, with a cooler tray and a work top assembly removed from the vehicle accessory rack.

FIG. 3, FIG. 4 and FIG. 5 shows details of accessory rack 302. FIG. 3 shows a front view of accessory rack 302 removed from vehicle 102, and with no accessories coupled to accessory rack 302. FIG. 4 shows a front perspective view of accessory rack 302, with a cooler tray 340 and a work top 356 removed from accessory rack 302 so that the support structure of accessory rack 302 can be easily seen. FIG. 5 shows a side view of accessory rack 302, without cooler tray 340 and work top 356, being coupled to hitch receiver 108 of vehicle 102 using coupling assembly 410. FIG. 5 illustrates how coupling assembly 410 couples accessory rack 302 to hitch receiver 108 of vehicle 102.

Base rack 120 is best seen in FIG. 3 and FIG. 4. Base rack 120 holds multipurpose swing arm assembly 310 and tire holder swing arm assembly 210. Base rack 120 includes an upper support rod 130, a first hinge tube 140, a second hinge tube 150, a first lower support rod 160, and a second lower support rod 170, as shown in FIG. 3 and FIG. 4.

Upper support rod 130 is an elongate rod formed of rigid material, metal in this embodiment. The term "rod" in this document refers to any elongate rigid structure such as, but not limited to, a bar, tube, or pipe. In the embodiments shown in the figures, upper support rod 130 is a straight elongate hollow tube. Upper support rod 130 has an upper support rod first end 131, an upper support rod second end 132 opposing upper support rod first end 131, and an upper rod longitudinal axis 133 (see FIG. 4). Upper rod longitudinal axis 133 is parallel to a bumper longitudinal axis 104 of a bumper 103 on vehicle 102, see FIG. 2.

First hinge tube 140 is coupled to upper support rod first end 131 (FIG. 4). First hinge tube 140 is a straight elongate tube in this embodiment. First hinge tube 140 has a first hinge tube longitudinal axis 143 (FIG. 4). First hinge tube longitudinal axis 143 is perpendicular to upper rod longitudinal axis 133. First hinge tube 140 is used to hingedly couple multipurpose swing arm assembly 310 to base rack 120 and becomes part of a hinge 309 (FIG. 2 and FIG. 4) that hingedly couples multipurpose swing arm assembly 310 to base rack 120.

Second hinge tube 150 is coupled to upper support rod second end 132. Second hinge tube 150 is a straight elongate tube in this embodiment. Second hinge tube 150 has a second hinge tube longitudinal axis 153 (FIG. 4). Second hinge tube longitudinal axis 153 is perpendicular to upper rod longitudinal axis 133. Second hinge tube 150 is used to hingedly couple tire holder swing arm assembly 210 to base rack 120 and becomes part of a hinge 209 (FIG. 2 and FIG. 4) that hingedly couples tire holder swing arm assembly 210 to base rack 120.

First lower support rod 160 and a second lower support rod 170 are best seen in FIG. 3 and FIG. 4. First and second lower support rods 160 and 170 provide both the lower connection between first and second hinge tubes 140 and 150, and the connection between upper support rod 130 and coupling assembly 410. Coupling assembly 410 is coupled to base rack 120 and upper support rod 130 by being coupled to first and second lower support rods 160 and 170. In some embodiments, first and second lower support rods 160 and 170 are welded to hitch coupling assembly 410.

First lower support rod 160 extends between first hinge tube 140 and coupling assembly 410. First lower support rod 160 extends from coupling assembly 410 towards a vehicle driver's side 112 (FIG. 1) of vehicle 102 when accessory rack 302 is coupled to vehicle 102. First lower support rod 160 has a first lower rod first end 161, a first lower rod second end 162 opposing first lower rod first end 161, and a first lower rod bend 163 between first lower rod first end 161 and first lower rod second end 162. First lower rod bend 163 is a bend in first lower support rod 160 that allows for greater ground clearance at the outer ends of base rack 120 than in the middle at hitch coupling assembly 410. This larger ground clearance at the sides of accessory rack 302 allows vehicle 102 to easily drive over rocks, bumps, and other obstacles. First lower rod first end 161 is coupled to first hinge tube 140. First lower rod second end 162 is coupled to a receiver tube 420 of hitch coupling assembly 410, see FIG. 3.

Second lower support rod 170 extends between second hinge tube 150 and receiver tube 420 of coupling assembly 410, see FIG. 3 and FIG. 4. Second lower support rod 170 extends from coupling assembly 410 towards a vehicle passenger side 114 (FIG. 1) of vehicle 102 when accessory rack 302 is coupled to vehicle 102. Second lower support rod 170 has a second lower rod first end 171, a second lower rod second end 172 opposing second lower rod first end 171, and a second lower rod bend 173 between second lower rod first end 171 and second lower rod second end 172. Second lower rod bend 173 is a bend in second lower support rod 170 that allows for greater ground clearance at the outer ends of base rack 120 than in the middle at hitch coupling assembly 410. Second lower rod first end 171 is coupled to second hinge tube 150. Second lower rod second end 172 is coupled to receiver tube 420 of coupling assembly 410.

Base rack 120, in the embodiment shown in the figures, includes several additional rods or bars to add structural support to base rack 120, see FIG. 3. Base rack 120 includes a first base rack angle support bar 180, a second base rack angle support bar 181, and a base rack vertical bar 182. First base rack angle support bar 180 extends between, and couples to, first lower support rod 160 and upper support rod 130. In the embodiment shown in the figures, first base rack angle support bar 180 extends between, and couples to, first lower rod bend 163 and upper support rod 130, but this is not meant to be limiting. Second base rack angle support bar 181 extends between, and couples to, second lower support rod 170 and upper support rod 130. In the embodiment shown in the figures, second base rack angle support bar 181 extends between, and couples to, second lower rod bend 173 and upper support rod 130, but this is not meant to be limiting.

Base rack vertical bar 182 extends between, and couples to, coupling assembly 410 and upper support rod 130. In the embodiment shown in the figures, base rack vertical bar 182 is coupled to upper support rod 130 at one end, and to an accessory trailer hitch receiver 412 of coupling assembly 410 at the other end. In some embodiments, where coupling assembly 410 does not include accessory trailer hitch receiver 412, base rack vertical bar 182 is coupled to upper support rod 130 at one end, and to receiver tube 420 at the other end.

Coupling assembly 410 is best seen in FIG. 4 and FIG. 5. FIG. 5 shows an exploded view of coupling assembly 410 coupling to hitch receiver 108 of vehicle 102. Additional details of coupling assembly 410 can be found in U.S. patent application Ser. No. 16/365,432 filed Mar. 26, 2019, which is incorporated entirely herein by reference. Coupling assembly 410 couples to hitch receiver 108 to couple accessory rack 302 (FIG. 1 and FIG. 2) to vehicle 102. Coupling assembly 410 includes a receiver tube 420, a receiver wedge tube 452 that is coupled to receiver tube 420, and a tightening bolt 460 that is used to couple receiver wedge tube 452 to receiver tube 420. Base rack 120 of accessory rack 302 is coupled to receiver tube 420, as shown in FIG. 4 and FIG. 5. In this embodiment, receiver tube 420 is coupled to first and second lower support rod 160 and 170 of base rack 120. First and second lower support rods 160 and 170 attach receiver tube 420 of coupling assembly 410 to upper support rod 130 of base rack 120.

Receiver tube 420 is an elongate hollow tube, of metal in this embodiment, with a rounded rectangular shaped transverse cross section. Receiver tube 420 is shaped to fit snugly into hitch receiver 108 (see FIG. 5). Receiver tube 420 has a receiver tube first end 421, a receiver tube second end 422 opposing receiver tube first end 421, and a receiver tube longitudinal axis 423. Receiver tube 420 is hollow, with an opening at both receiver tube first end 421 and receiver tube second end 422.

Receiver tube 420 has a bulkhead inside of receiver tube 420, positioned between receiver tube first end 421 and receiver tube second end 422. The bulkhead is a wall coupled to each of the four sides of receiver tube 420. The bulkhead has a bulkhead hole through the bulkhead, large enough for a threaded shaft of tightening bolt 460 to pass through the bulkhead. The bulkhead is used by tightening bolt 460 to couple receiver wedge tube 452 to receiver tube 420.

Receiver wedge tube 452 is coupled to receiver tube 420 with tightening bolt 460. Receiver wedge tube 452 is a hollow tube, of metal in this embodiment, with a rounded rectangular shaped transverse cross section. Receiver wedge tube 452 has a cap on one end having a hole large enough for a threaded shaft of tightening bolt 460 to pass through, but not large enough for a bolt head of tightening bolt 460 to pass through. The cap on one end of receiver wedge tube 452 captures the bolt head of tightening bolt 460 so that tightening bolt 460 cannot rotate.

Tightening bolt 460 couples receiver tube 420 and receiver wedge tube 452 together before they are coupled to hitch receiver 108, as shown in FIG. 5. Receiver tube 420 and receiver wedge tube 452 are two separate pieces so that they can slide against each other inside hitch receiver 108. When receiver wedge tube 452 slides against receiver tube 420 and both are inside hitch receiver 108, both receiver tube 420 and receiver wedge tube 452 press against the inside surfaces of hitch receiver 108, frictionally attaching coupling assembly 410 to hitch receiver 108 and mechanically stabilizing coupling assembly 410 inside hitch receiver 108. Tightening bolt 460 is used to tighten receiver wedge tube 452 against receiver tube 420.

To couple receiver wedge tube 452 to receiver tube 420, tightening bolt 460 is first inserted through receiver wedge tube 452 and into second end 422 of receiver tube 420. Tightening bolt 460 is extended through the bulkhead of receiver tube 420. A nut 470 is threaded onto tightening bolt 460 by putting nut 470 through receiver tube first end 421. A socket wrench can be used to tighten nut 470 onto the threaded shaft of tightening bolt 460 by extending the socket wrench through receiver tube first end 421. Once nut 470 is threaded onto tightening bolt 460, receiver wedge tube 452 is coupled to receiver tube 420.

Coupling assembly 410 is coupled to hitch receiver 108 by inserting receiver wedge tube 452 and receiver tube 420, which is loosely coupled to receiver wedge tube 452, into hitch receiver 108, as shown in FIG. 5. Inserting receiver tube 420 and receiver wedge tube 452 into hitch receiver 108 of vehicle 102 attaches coupling assembly 410 and accessory rack 302 to vehicle 102. Coupling assembly 410 is tightened inside of hitch receiver 108 by turning nut 470 on the threaded shaft of tightening bolt 460 to compress receiver wedge tube 452 against receiver tube 420. Nut 470 can be tightened by extending a socket wrench through receiver tube first end 421. Pressing receiver wedge tube 452 against receiver tube 420 by tightening nut 470 causes receiver wedge tube 452 and receiver tube 420 to both press against the inside surfaces of hitch receiver 108, which frictionally couples receiver tube 420 and receiver wedge tube 452 inside hitch receiver 108. At this point, coupling assembly 410 and accessory rack 302 are coupled to hitch receiver 108 and vehicle 102.

Receiver tube 420 and hitch receiver 108 each have holes through their respective sides for a lock receiver to extend through, to lock coupling assembly 410 to hitch receiver 108, if desired.

Coupling assembly 410 also includes an accessory trailer hitch receiver 412, as shown in FIG. 4 and FIG. 5. Accessory trailer hitch receiver 412 is coupled to receiver tube 420 in this embodiment, but this is not meant to be limiting. Accessory trailer hitch receiver 412 is used when coupling assembly 410 and accessory rack 302 is installed in hitch receiver 108, and it is also desired that vehicle 102 be equipped to pull a trailer. Accessory trailer hitch receiver 412 can be used to pull a trailer with vehicle 102 when coupling assembly 410 is coupled to vehicle 102 using hitch receiver 108 on vehicle 102.

Figure 6:
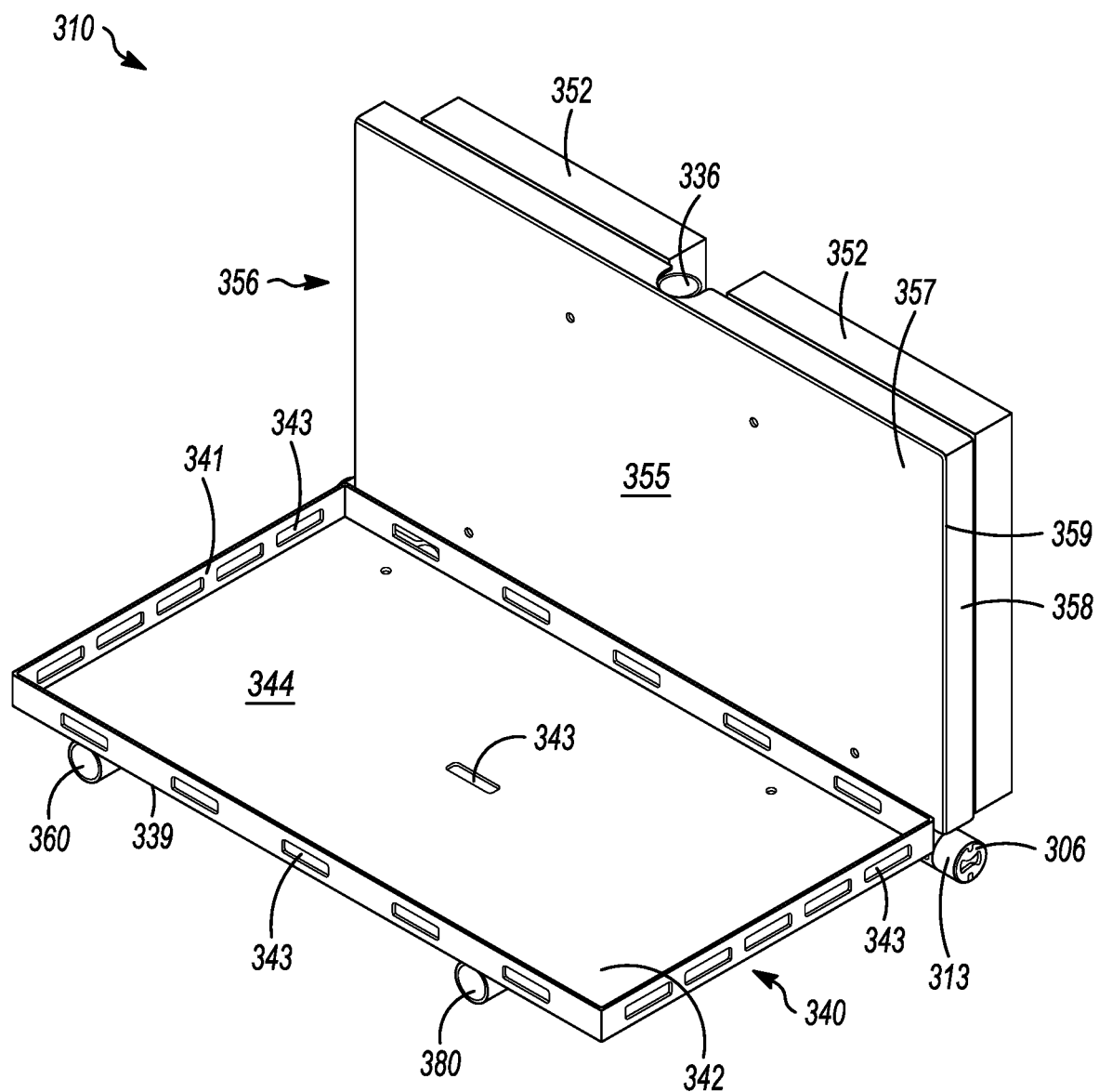
FIG. 6 shows a front perspective view of a multipurpose swing arm assembly of the vehicle accessory rack of FIG. 3.
Figure 7:
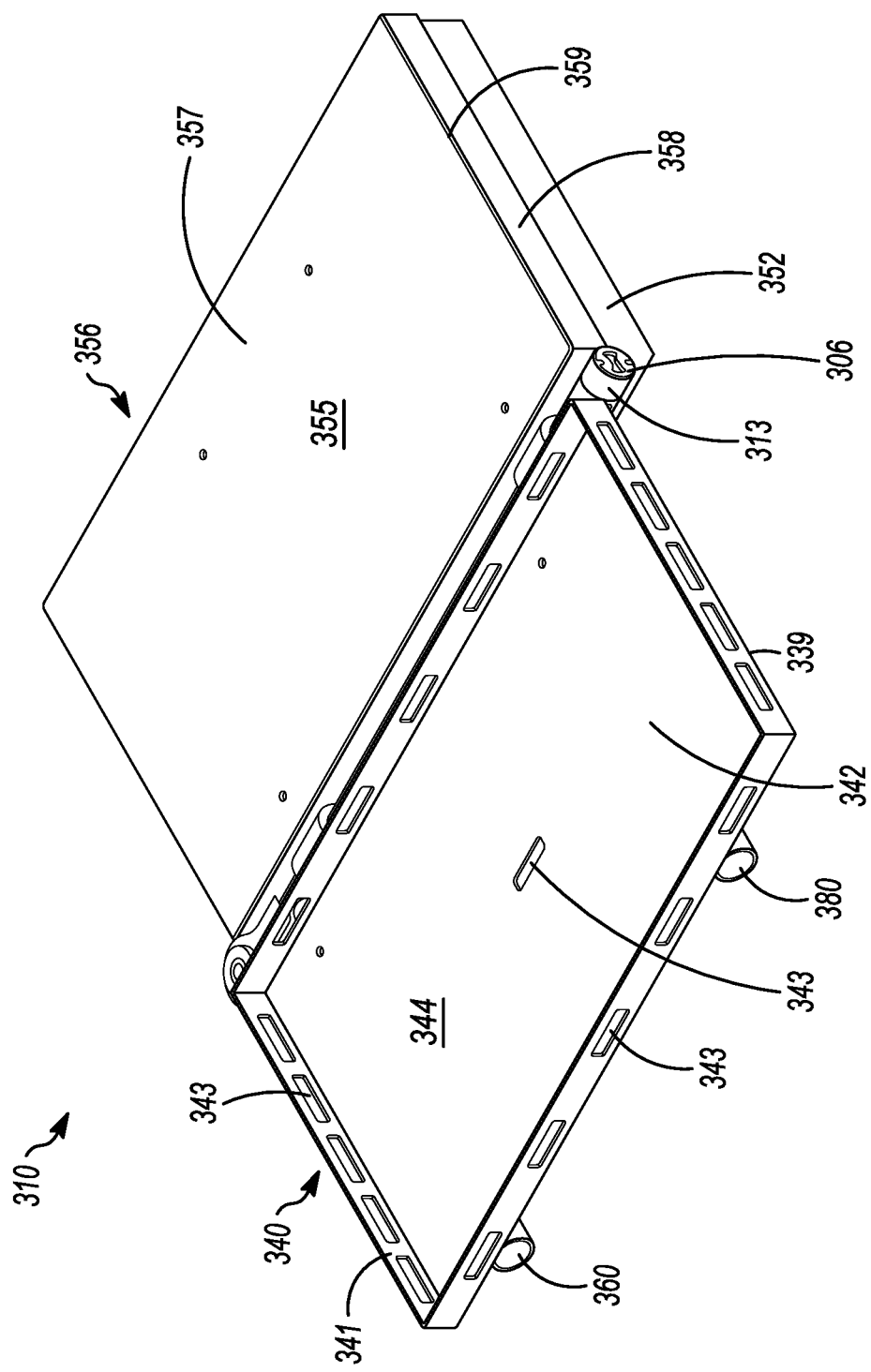
FIG. 7 shows a front perspective view of the multipurpose swing arm assembly of the vehicle accessory rack of FIG. 3, with the work top in a working position.
Figure 8:
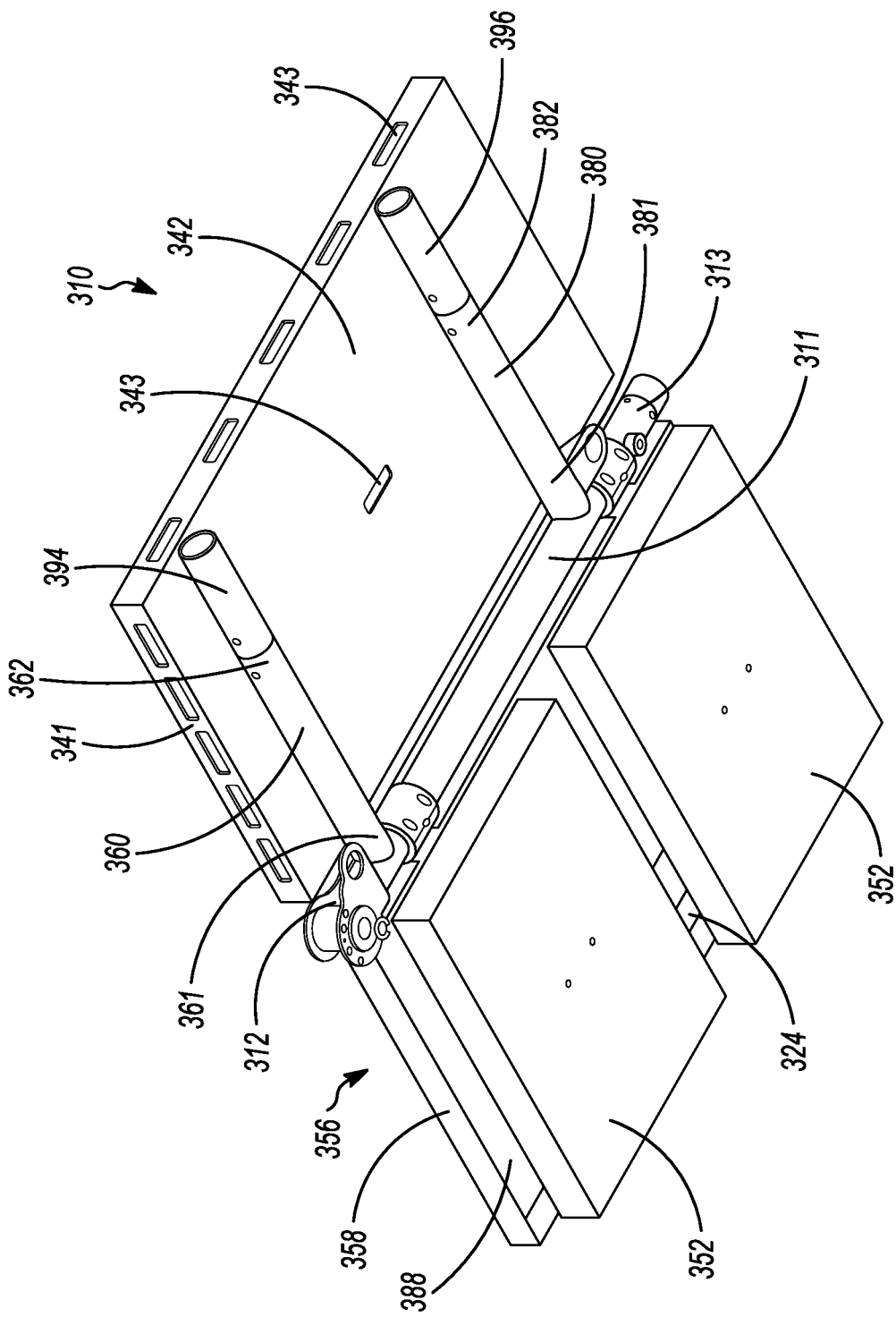
FIG. 8 shows a bottom perspective view of the multipurpose swing arm assembly of the vehicle accessory rack of FIG. 3, with the work top in a working position.
Figure 9:
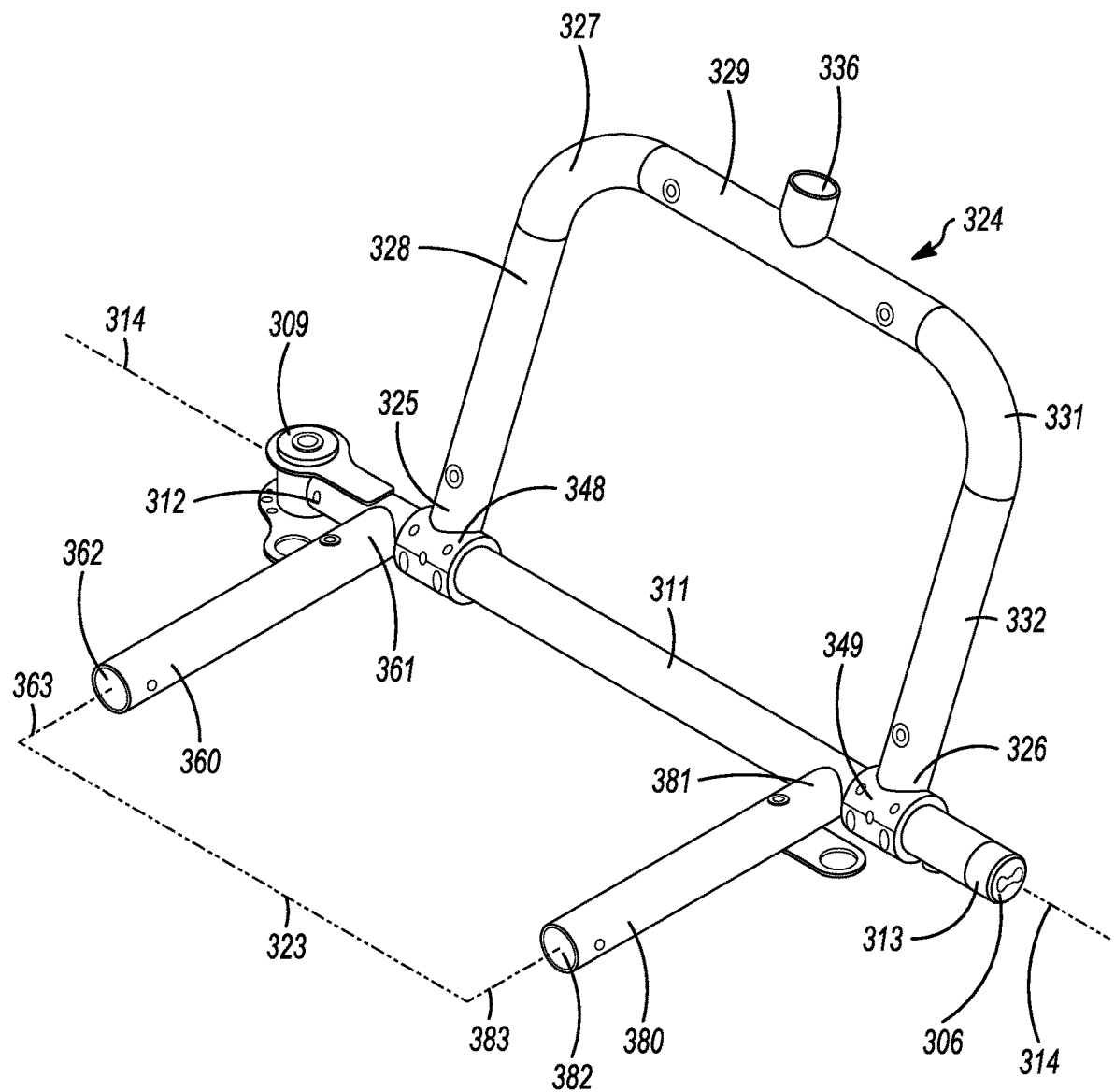
FIG. 9 shows a front perspective view of a multipurpose swing rod of the multipurpose swing arm assembly of the vehicle accessory rack of FIG. 3, with a first and a second cooler tray support rod and a work top bar coupled to the multipurpose swing rod.
Figure 10:
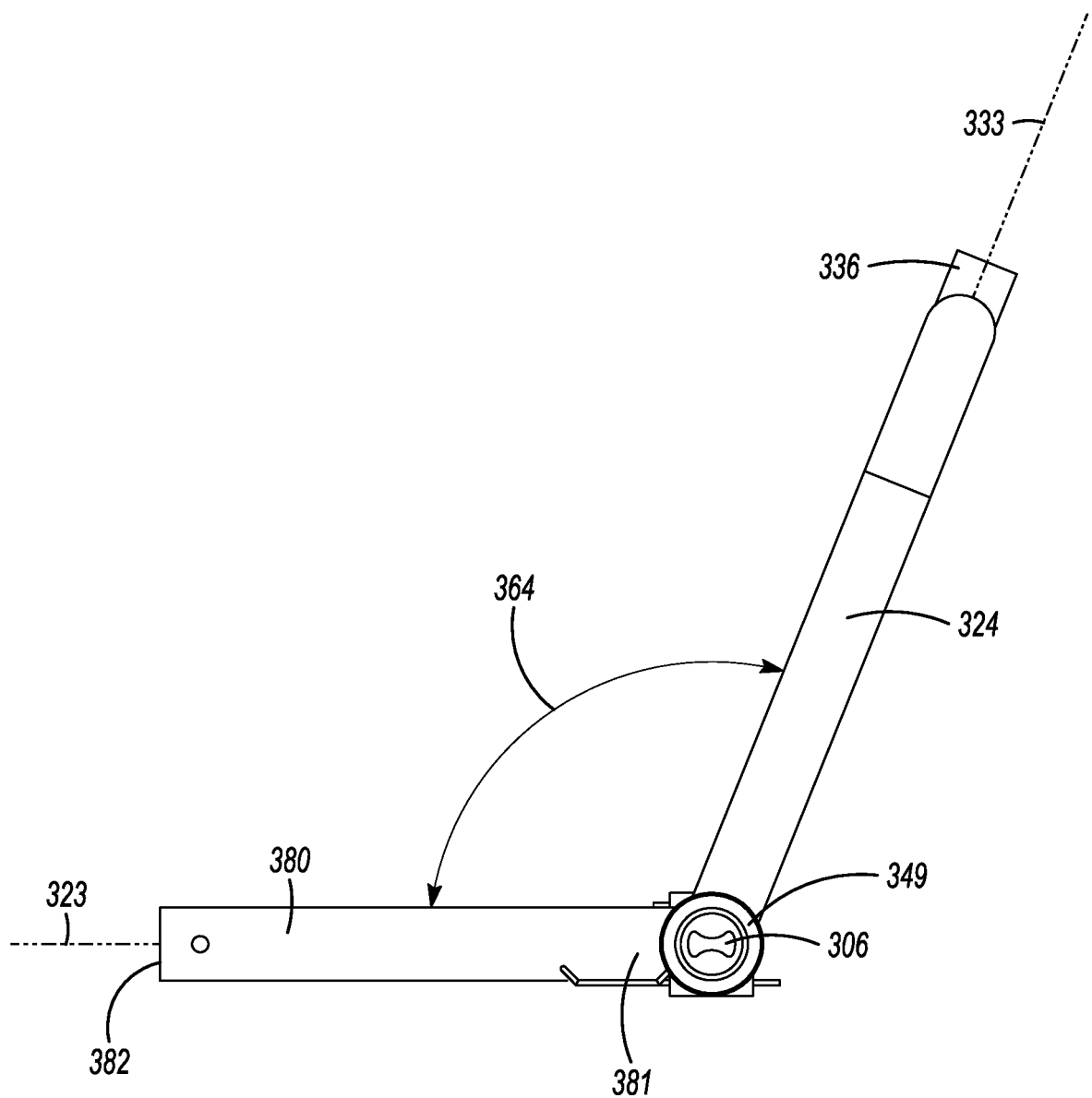
FIG. 10 shows a side view of the multipurpose swing rod of the multipurpose swing arm assembly of the vehicle accessory rack of FIG. 3, with a first cooler tray support rod and a work top bar coupled to the multipurpose swing rod.

FIG. 6 though FIG. 10 show details of multipurpose swing arm assembly 310. FIG. 6 shows a top perspective view of multipurpose swing arm assembly 310 with work top 356 in a stowed position. FIG. 7 shows a top perspective view of multipurpose swing arm assembly 310 with work top 356 in a lowered, or working, position. FIG. 8 shows a bottom perspective view of multipurpose swing arm assembly 310 with work top 356 in the working position. FIG. 9 shows a top perspective view of multipurpose swing arm assembly 310 with cooler tray 340 and work top 356 removed to show the structural elements of multipurpose swing arm assembly 310. FIG. 10 shows a side view of multipurpose swing arm assembly 310 with cooler tray 340 and work top 356 removed to view the structural elements of multipurpose swing arm assembly 310.

Multipurpose swing arm assembly 310 includes a multipurpose swing rod 311 (best seen in FIG. 9), and a number of removable and reconfigurable accessories and accessory support structures. The reconfigurable accessory and support elements include first and second cooler tray support rods 360 and 380, a work top bar 324, cooler tray 340, work top 356, and a tire mount extension bar 334 (seen in FIG. 3 and FIG. 4). These accessory elements can be added or removed in any combination to multipurpose swing arm assembly 310.

Multipurpose swing rod 311 is hingedly coupled to first hinge tube 140, see FIG. 3 and FIG. 4. Multipurpose swing rod 311 is an elongate rod of rigid material. In the embodiment shown in the figures, multipurpose swing rod 311 is a hollow metal tube, but this is not meant to be limiting. Multipurpose swing rod 311 is best seen in FIG. 4 and FIG. 9. Multipurpose swing rod 311 includes a multipurpose swing rod first end 312, a multipurpose swing rod second end 313 opposing multipurpose swing rod first end 312, and a multipurpose swing rod longitudinal axis 314 (FIG. 4 and FIG. 9). Multipurpose swing rod longitudinal axis 314 is parallel to upper rod longitudinal axis 133 when multipurpose swing arm assembly 310 is in multipurpose swing arm assembly stored position 315, as shown in FIG. 1, FIG. 3, and FIG. 4.

Multipurpose swing rod first end 312 is hingedly coupled to first hinge tube 140 so that multipurpose swing arm assembly 310 swings on base rack 120 from multipurpose swing arm assembly stored position 315 (FIG. 1) to open position 216 (FIG. 2). A hinge 309 (FIG. 2, FIG. 4, and FIG. 9) is coupled to multipurpose swing rod first end 312. Hinge 209 has a hinge rod extending from the bottom of hinge 209, which extends into first hinge tube 140 to hingedly couple multipurpose swing rod 311 to first hinge tube 140, upper support rod 130, and base rack 120.

In the embodiment shown in the figures, multipurpose swing rod 311 has a bottle opener end cap 306 coupled to multipurpose swing rod second end 313, best seen in FIG. 9 and FIG. 10. Bottle opener end cap 306 is an end cap that is coupled to multipurpose swing rod second end 313, with a cutout that is shaped to be used to remove bottle caps from bottles such as pop bottles or beer bottles. In some embodiments, multipurpose swing rod 311 does not includes bottle opener end cap 306.

Multipurpose swing arm assembly 310 includes first and second cooler tray support rods 360 and 380 coupled to multipurpose swing rod 311, best seen in FIG. 4, FIG. 8, FIG. 9, and FIG. 10. First and second cooler tray support rods 360 and 380 are each elongate straight rods of rigid material that are removably coupled to multipurpose swing rod 311. In this embodiment, first and second cooler tray support rods 360 and 380 are formed of round hollow tubes of metal. Cooler tray support rods as described in this document are labeled using "first", "second", etc. but these numbering labels are for ease of discussion only and are interchangeable and not meant to designate order or priority. First and second cooler tray support rods 360 and 380 removably couple to multipurpose swing rod 311 so that they can be used when needed and removed from multipurpose swing arm assembly 310 when not needed.

First cooler tray support rod 360 has a first cooler tray support rod first end 361 coupled to multipurpose swing rod 311, see FIG. 9. First cooler tray support rod 360 has a first cooler tray support rod second end 362 opposing first cooler tray support rod first end 361. First cooler tray support rod 360 has a first cooler tray support rod longitudinal axis 363 (FIG. 9) that is perpendicular to multipurpose swing rod longitudinal axis 314.

Second cooler tray support rod 380 has a second cooler tray support rod first end 381 coupled to multipurpose swing rod 311, see FIG. 9. Second cooler tray support rod 380 has a second cooler tray support rod second end 382 opposing second cooler tray support rod first end 381. Second cooler tray support rod 380 has a second cooler tray support rod longitudinal axis 383 (FIG. 9) that is perpendicular to multipurpose swing rod longitudinal axis 314.

In some embodiments, extensions are coupled to first and/or second cooler tray support rods 360 or 380 to give them the ability to provide support to wider or heavier accessories. For example, in FIG. 8, a first support rod extension 394 is coupled to first cooler tray support rod second end 362 of first cooler tray support rod 360. A second support rod extension 396 is coupled to second cooler tray support rod second end 382. First and second support rod extensions 394 and 396 are straight rods of hollow metal in this embodiment. First and second support rod extensions 394 and 396 can be coupled to first and second cooler tray support rods 360 and 382 when vehicle 102 is not moving, for example. When multipurpose swing arm assembly 310 is put in multipurpose swing arm assembly stored position 315, first and second support rod extensions 394 and 396 can be removed from first and second cooler tray support rods 360 and 380. Removing first and second support rod extensions 394 and 396 allows multipurpose swing arm assembly 310 to be configured to minimize the distance multipurpose swing arm assembly 310 extends from the rear of vehicle 102, which can help for parking and maneuvering of vehicle 102.

First and second cooler tray support rods 360 and 380, and multipurpose swing rod longitudinal axis 314, each lie in a cooler tray support rod plane 323, see FIG. 9 and FIG. 10. First and second cooler tray support rods 360 and 380 are perpendicular to multipurpose swing rod longitudinal axis 314. First and second cooler tray support rods 360 and 380, and first and second cooler tray support rod longitudinal axes 363 and 383, are parallel to each other.

Cooler tray 340 (FIG. 1, FIG. 2, and FIG. 6 through FIG. 8) is coupled to first and second cooler tray support rods 360 and 380, in the embodiment of accessory rack 302 shown in the figures. Cooler tray 340 is fixedly but removably coupled to first and second cooler tray support rods 360 and 380 in this embodiment. In the embodiment shown, cooler tray 340 is coupled to first and second cooler tray support rods 360 and 380 using screws. Cooler tray 340 is an optional element of multipurpose swing arm assembly 310, and can be removed if not used.

Cooler tray 340 is configured to support cooler 308 for travel with vehicle 102, as shown in FIG. 1. Cooler tray 340 includes a cooler tray flat plate of rigid material 342 (FIG. 6 and FIG. 7). Cooler tray flat plate of rigid material 342 is formed of a sheet of metal in this embodiment. Cooler tray flat plate of rigid material 342 is rectangular shaped in top view in this embodiment, but that is not meant to be limiting. Cooler tray flat plate of rigid material 342 has a cooler tray flat plate perimeter 339 around the outer perimeter of cooler tray flat plate of rigid material 342. Cooler tray flat plate of rigid material 342 has a cooler tray flat plate top surface 344, which is the surface that cooler 308 sits on. A cooler tray flat plate lip 341 extends from cooler tray flat plate perimeter 339. Lip 341 is one or more piece of flat rigid material that extends from cooler tray flat plate perimeter 339 to help cooler 308 to not slide off of cooler tray flat plate 342. Cooler tray flat plate lip 341 extends perpendicular to cooler tray flat plate of rigid material 342 in a direction towards cooler tray flat plate top surface 344 and away from a bottom surface of cooler tray flat plate of rigid material 342. Cooler tray 340 has seep holes 343 (FIG. 6 through FIG. 8) through cooler tray 340 to allow any liquid that may fall on cooler tray 340 to seep through and not build up on cooler tray 340.

Cooler 308 can be set on, or coupled to, cooler tray 340 and multipurpose swing arm assembly 310 to transport or use cooler 308 with vehicle 102, as shown in FIG. 1 and FIG. 2. A "cooler" as is used in this document is an insulated box for keeping items in the box hot or cold. Cooler 308 can be any type of insulated box or container for containing hot or cold food or drinks, for example. In the embodiment shown in FIG. 1 and FIG. 2, cooler 308 is a commercially available cooler with a hinged lid.

In the embodiment shown in the figures, multipurpose swing arm assembly 310 includes a work top bar 324 and work top 356 coupled to work top bar 356. Work top bar 324 and work top 356 can be added or removed from multipurpose swing arm assembly 310 as desired, to allow multipurpose swing arm assembly 310 to be configurable for different uses.

Work top bar 324 is the structural support for work top 356, in the embodiment shown in the figures. Work top bar 324 is hingedly coupled to multipurpose swing rod 311, best seen in FIG. 4, FIG. 9, and FIG. 10. Work top bar 324 includes a work top bar first end 325 and a work top bar second end 326 opposing work top bar first end 325, see FIG. 4 and FIG. 9. Work top bar 324 is formed of an elongate bar of rigid material with bends in it. In this embodiment, work top bar 324 is formed of hollow metal tubing.

Work top bar first end 325 and work top bar second end 326 are both coupled to multipurpose swing rod 311. Work top bar first end 325 is coupled to multipurpose swing rod 311 using a first adjustable tension ring 348 (FIG. 9). Work top bar second end 326 is coupled to multipurpose swing rod 311 using a second adjustable tension ring 349. First and second adjustable tension rings 348 and 349 are used to allow work top bar 324 to hingedly rotate around multipurpose swing rod 311, or to not allow work top bar 324 to move with respect to multipurpose swing rod 311. First and second adjustable tension rings 348 and 349 are adjustable rings or clamps of a rigid or semi-rigid material that are wrapped around multipurpose swing rod 311 and provide a means for the tension on multipurpose swing rod 311 to be adjusted. In the embodiment shown in the figures, first and second adjustable tension rings 348 and 349 are metal ring clamps that use set screws to adjust tension on multipurpose swing rod 311. First adjustable tension ring 328 is coupled to work top bar first end 325 as shown in FIG. 9. First adjustable tension ring 348 wraps around multipurpose swing rod 311. The tension on multipurpose swing rod 311 by first adjustable tension ring 348 is adjusted using set screws. Similarly, second adjustable tension ring 349 is coupled to work top bar second end 326, and is wrapped around multipurpose swing rod 311 with adjustable tension on multipurpose swing rod 311 using set screws. By adjusting the set screws of first adjustable tension ring 348 and second adjustable tension ring 349, work top bar 324 can either rotate around multipurpose swing rod 311, or, the set screws can be tightened, and work top bar will be fixedly coupled to multipurpose swing rod 311. Allowing work top bar 324 to rotate around multipurpose swing rod 311 adjusts a work top bar angle 364 (FIG. 10) between a work top bar plane 333 and cooler tray support rod plane 323. Work top bar 324 lies in work top bar plane 333. Work top bar angle 364 can be set to 90 degrees for stowing—for traveling in vehicle 102, as shown in FIG. 1, FIG. 4, FIG. 5, and FIG. 6. Work top bar angle 364 can be set to 180 degrees for use of work top 356. Use of work top 356 can includes setting things on top of work top 356 when vehicle 102 is parked, or for using work top 356 as a table to work or prepare food on. Work top bar angle 364 is adjustable at least between about 90 degrees and about 180 degrees.

Details of work top bar 324 are best seen in FIG. 9. Work top bar 324 includes a work top bar first bend 327, and a work top bar first end section 328 that extends from work top bar first end 325 to work top bar first bend 327. Work top bar 324 also includes a work top bar second bend 331, and a work top bar center section 329 that extends between work top bar first bend 327 to work top bar second bend 331. Work top bar first and second bends 327 and 331 form work top bar 324 into a somewhat U-shape, as can be seen in FIG. 9. Work top bar center section 329 is parallel to multipurpose swing rod longitudinal axis 314. Work top bar center section 329 has an extension stub 336 coupled to work top bar center section 329 between work top bar first bend 327 and work top bar second bend 331. Extension stub 336 is a short piece of hollow tube that is used to couple a removeable tire mount extension bar 334 (best seen in FIG. 4) to work top bar center section 329. Work top bar 324 also has a work top bar second end section 332 that extends from work top bar second bend 331 to work top bar second end 326.

Work top bar 324 is a support structure that can be used for supporting work top 356 or other accessories. In the embodiment shown in the figures, work top 356 is coupled to work top bar 324 (best seen in FIG. 8). In this embodiment, work top 356 is coupled to work top bar 324 using screws through work top 356 and into work top bar 324.

Work top 356 includes a work top flat plate 357 formed of a rigid material, see FIG. 6, FIG. 7, and FIG. 8. Work top flat plate 357 is a sheet of metal in this embodiment, but this is not meant to be limiting. Work top flat plate 356 has a work top flat plate top surface 355, a work top flat plate bottom surface 338 (FIG. 8) and a work top flat plate perimeter 359 along the perimeter of work top flat plate 357. Work top 356 also includes a work top lip 358 extending from work top flat plate perimeter 359. Work top lip 358 is one or more short piece of rigid material, metal sheet in this embodiment, that surrounds work to flat plate 357 as a lip along work top flat plate perimeter 359. Work top lip 358 is perpendicular to work top flat plate 357 in this embodiment, and extends away from work top flat plate top surface 355, see FIG. 6 and FIG. 7.

Work top 356 can be used as a table surface when work top bar 324 is swing down in working position, such that work top bar angle 364 is 180 degrees, as shown in FIG. 2, FIG. 7 and FIG. 8. With multipurpose swing arm assembly 310 in the working position, as shown in FIG. 2, FIG. 7 and FIG. 8, work top 356 can be used to prepare foods, for example, or as a table to eat at, of any number of other uses. When work top 356 is not being used, work top 356 can be stowed by folding work top bar 324 and work top 356 up into a stowed position, with work top bar angle 364 at about 90 degrees, as shown in FIG. 6, for example.

In some embodiments, one or more fluid storage container 352 is coupled to work top flat plate bottom surface 338, as shown in FIG. 2, FIG. 6, FIG. 7, and FIG. 8. Fluid storage container 352 can be configured to hold water, fuel, or any other fluid that it is desired to transport. In some embodiments, fluid storage container 352 is the same or similar shape and configuration as spare fuel tank 232, as shown in FIG. 2.

In some embodiments, multipurpose swing arm assembly 310 includes a tire mount extension bar 334 coupled to work top bar 324, as shown in FIG. 3 and FIG. 4. Tire mount extension bar 334 is removable, and an optional accessory for use with work top bar 324 and multipurpose swing arm assembly 310. Tire mount extension bar 334 is used when it is desired to mount a spare tire 318 onto multipurpose swing arm assembly 310. Tire mount extension bar 324 is an elongate bar of rigid material, hollow metal tube in this embodiment. Tire mount extension bar 324 has a tire mount extension bar first end 345 and a tire mount extension bar second end 346 opposing tire mount extension bar first end 345. Tire mount extension bar 334 is coupled to tire mount bar 324 by sliding tire mount extension bar first end 345 into extension stub 336, and coupling tire mount extension bar 334 to extension stub 336 using couplers such as screws, set screws, etc. In the embodiment shown in FIG. 3 and FIG. 4, a tie loop 335 is coupled to tire mount extension bar second end 346. Tie loop 335 is a loop of rigid material, metal in this embodiment, that is convenient for passing flexible straps or ties through. With tire mount extension bar 334 coupled to work top bar 324, and tie loop 335 coupled to tire mount extension bar 334, a spare tire 318 can be set on multipurpose swing arm assembly 310 and tied in place using tie loop 335, for example. Spare tire 318 can set on first and second cooler tray support rods 360 and 380, or on cooler tray 340 instead of cooler 308. This expands the capabilities and flexibilities of multipurpose swing arm assembly 310 and accessory rack 302.

Figure 11:
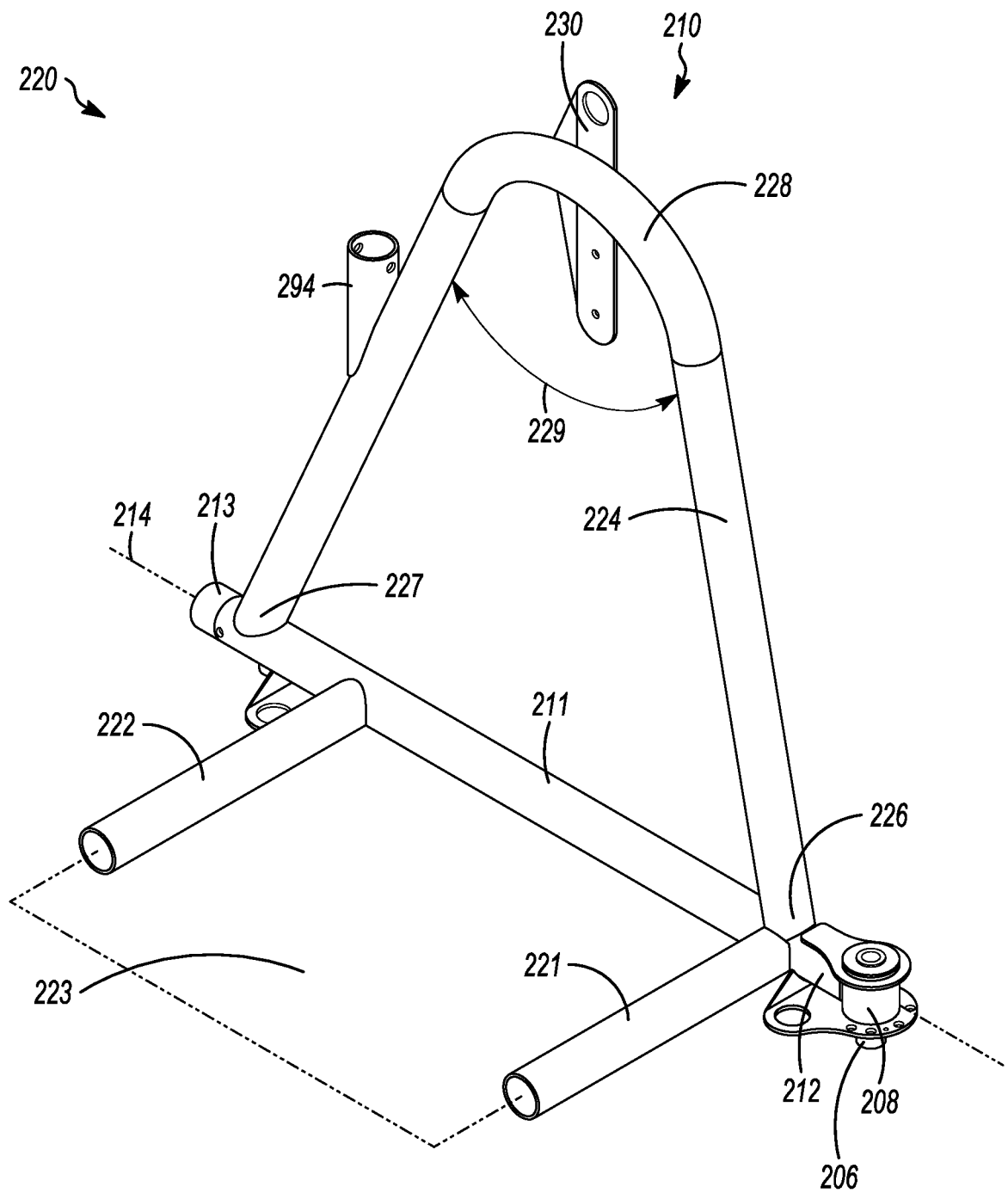
FIG. 11 shows a front perspective view of a tire holder swing arm assembly of the vehicle accessory rack of FIG. 3.

In the embodiments of accessory rack 302 shown in the figures, accessory rack 302 includes tire holder swing arm assembly 210, as shown in FIG. 1 through FIG. 5, and FIG. 11. FIG. 11 shows a front perspective view of tire holder swing arm assembly 210. In some embodiments of accessory rack 302, tire holder swing arm assembly 210 is removed from base rack 120 and not included in accessory rack 302. Both tire holder swing arm assembly 210 and multipurpose swing arm assembly 310 are repeatably able to be coupled to, and removed from, accessory rack 302 to accommodate different uses of accessory rack 302. In some embodiments, either tire holder swing arm assembly 210 or multipurpose swing arm assembly 310 can be replaced with a swing arm assembly that holds a barbecue. More information on a swing arm assembly that holds a barbecue can be found in U.S. patent application Ser. No. 16/365,512 filed Mar. 26, 2019 an incorporated entirely herein by reference.

Tire holder swing arm assembly 210 is removably and rotatably coupled to second hinge tube 150, as shown in FIG. 1 through FIG. 4. Tire holder swing arm assembly 210 is removably coupled to second hinge tube 150 so that tire holder swing arm assembly 210 can be removed and replaced with a swing arm assembly that carries different accessories than tire holder swing arm assembly 210. This allows accessory rack 302 to be easily customized to carry different accessories. In the embodiments shown in the figures, tire holder swing arm assembly 210 includes a tire rack 220. Tire holder swing arm assembly 210 is hingedly coupled to second hinge tube 150 so that tire holder swing arm assembly 210 can swing out from the center of base rack 120, which allows access to the rear doors or tailgate of vehicle 102, see FIG. 2. In some embodiments, the accessories mounted to tire holder swing arm assembly 210 are meant to be used with tire holder swing arm assembly 210 swung out from base rack 120. FIG. 1 shows tire holder swing arm assembly 210 positioned in a tire holder swing arm assembly stored position 255. FIG. 2 shows tire holder swing arm assembly 210 in an open position 216, where tire holder swing arm assembly 210 is swung away from the center portion of base rack 120.

Tire holder swing arm assembly 210 includes a tire holder swing rod 211, best seen in FIG. 4 and FIG. 11. Tire holder swing rod 211 is an elongate rod or bar of rigid material, metal in this embodiment. Tire holder swing rod 211 has a tire holder swing rod first end 212 and a tire holder swing rod second end 213 opposing tire holder swing rod first end 212. Tire holder swing rod 211 has a tire holder swing rod longitudinal axis 214 that extends from tire holder swing rod first end 212 to tire holder swing rod second end 213. Tire holder swing rod first end 212 is removably and hingedly coupled to second hinge tube 150, see FIG. 4, using a hinge 208. Tire holder swing rod first end 212 is coupled to hinge 208, see FIG. 11. Hinge 208 is rotatably coupled to second hinge tube 150 such that hinge 208 and tire holder swing rod 211 can rotate in second hinge tube 150. Hinge 208 has a hinge rod 206 (FIG. 11) that slides into and out of second hinge tube 150 to removably and rotatably couple tire holder swing rod 211 to second hinge tube 150.

Tire holder swing rod assembly 210 includes two tire holder support rods 221 and 222. Tire holder support rods 221 and 222 are used to support spare tire 218, accessories, or other support structures that carries accessories, for example. Tire holder support rods as described in this document are labeled using "first" and "second" etc. but these numbering labels are for ease of discussion only and are interchangeable and not mean to designate order or priority. Tire holder swing rod assembly 210 includes first tire holder support rod 221 and second tire holder support rod 222. First tire holder support rod 221 and second tire holder support rod 222 are both straight elongate bars or rods of rigid material. First tire holder support rod 221 and second tire holder support rod 222 are hollow metal tubes in the embodiment shown in the figures. First tire holder support rod 221 is coupled to tire holder swing rod 211 at one end of first tire holder support rod 221. Second tire holder support rod 222 is coupled to tire holder swing rod 211 at one end of second tire holder support rod 221. First and second tire holder support rods 221 and 222 lie in a tire holder support rod plane 223, see FIG. 11. First tire holder support rod 221 and second tire holder support rod 222 are both perpendicular to tire holder swing rod longitudinal axis 214 and tire holder swing rod 211.

Tire holder swing arm assembly 210 includes tire rack 220 (FIG. 11) that includes a tire holder bar 224. Tire holder bar 224 is a bent bar or rod of rigid material, hollow metal tube in this embodiment, that is used to couple a tire to. Tire holder bar 224 has a tire holder bar first end 226 coupled to tire holder swing rod 211. Tire holder bar 224 has a tire holder bar second end 227 that is also coupled to tire holder swing rod 211. Tire holder bar 224 has a tire holder bar bend 228 between tire holder bar first end 226 and tire holder bar second end 227. Tire holder bar bend 228 has a tire holder bar bend angle 229 of between about 35 and about 40 degrees. In the embodiment shown, tire holder bar bend angle 229 has an angular value of about 37.5 degrees. In some embodiments, tire holder bar bend angle is between about 30 to about 45 degrees. These angular values provide tire holder bar 224 with enough width and stability to hold spare tire 218, with either end of tire holder bar 224 able to couple to tire holder swing rod 211.

Tire holder bar 224 lies in a tire holder bar plane 225 (FIG. 5). Tire holder bar plane 225 is perpendicular to tire holder support rod plane 223, see FIG. 5.

Tire rack 220 of tire holder swing arm assembly 210 holds a spare tire 218, as shown in FIG. 1 and FIG. 2. Spare tire 218 sits on first and second tire holder support rods 221 and 222 and is secured to tire holder bar 224.

Tire rack 220 of tire holder swing arm assembly 210 also includes a fuel tank coupler 230, see FIG. 11. Fuel tank coupler 230 is a flat bar of rigid material with holes in it for coupling spare fuel tank 232 to. Fuel tank coupler 230 is coupled to tire holder bar 224 at tire holder bar bend 228, as shown in FIG. 11. Fuel tank coupler 230 is coupled to tire holder bar 224 at tire holder bar bend 228 with a longitudinal axis of fuel tank coupler 230 perpendicular to tire holder swing rod longitudinal axis 214. A spare fuel tank 232 is coupled to fuel tank coupler 230, as shown in FIG. 2.

Tire rack 220 of tire holder swing arm assembly 210 also includes a hammock mount 294, see FIG. 3, FIG. 4, and FIG. 11. Hammock mount 294 is coupled to tire holder bar 224, as shown in FIG. 4 and FIG. 11. Hammock mount 294 is a vertically-oriented hollow tube of rigid material with a longitudinal axis that is perpendicular to tire holder swing rod longitudinal axis 214. A hammock tube that couples to one end of a hammock is slid into hammock mount 294 to hold one end of the hammock for use.

Accessory rack 302 includes two locking pins, a first locking pin 190 and a second locking pin 195, that are used to lock multipurpose swing arm assembly 310 and tire holder swing arm assembly 210 in stored positions 315 and 255, see FIG. 3 and FIG. 4, FIG. 12, and FIG. 13. FIG. 12 and FIG. 13 provide details of first locking pin 190. When tire holder swing arm assembly 210 is in tire holder swing arm assembly stored position 255, as shown in FIG. 1, FIG. 3 and FIG. 4, tire holder swing rod 211 is parallel to and adjacent upper support rod 130. When multipurpose swing arm assembly 310 is in multipurpose swing arm assembly stored position 315, as shown in FIG. 1, FIG. 3 and FIG. 4, multipurpose swing rod 311 is parallel to and adjacent upper support rod 130. First and second locking pins 190 and 195 are spring loaded. First and second locking pins 190 and 195 are coupled to, and extend through, upper support rod 130, best seen in FIG. 3 and FIG. 4. First and second locking pins 190 and 195 reciprocatably extend into either multipurpose swing rod 311 or tire holder swing rod 211 to lock multipurpose swing arm assembly 310 or tire holder swing arm assembly 210 in stored positions 315 or 255. FIG. 4 shows multipurpose swing arm assembly 310 and tire holder swing arm assembly 210 in stored positions 315 and 255, with first locking pin 190 locking multipurpose swing rod 311 in multipurpose swing arm assembly stored position 315, and second locking pin 195 locking tire holder swing rod 211 in tire holder swing arm assembly stored position 255.

FIG. 12 shows a partial cutaway of locking pin 190. Locking pin 195 is identical to locking pin 190, except locking pin 195 is used on tire holder swing arm assembly 210 instead of multipurpose swing arm assembly 310. FIG. 13 shows a close-up view of locking pin 190 extending through upper support rod 130 and into multipurpose swing rod 311 to lock multipurpose swing rod 311 in multipurpose swing arm assembly stored position 315 as shown in FIG. 4.

First locking pin 190 includes a locking pin inner shaft 191, an outer sleeve 189, and a spring 199. Locking pin inner shaft 191 is a round straight bar or rod of rigid material, metal in this embodiment. Locking pin inner shaft 191 has an inner shaft first end 193 and an inner shaft second end 194 opposing inner shaft first end 193. Locking pin inner shaft 191 has a T-handle 192 coupled to inner shaft first end 193. Locking pin inner shaft 191 has a threaded section 198 at inner shaft second end 194. Threaded section 198 is threads cut into inner shaft second end 194. Spring 199 is slid over, and couples to, locking pin inner shaft 191, see FIG. 12.

Outer sleeve 189 is a hollow tube of rigid material, metal in this embodiment. Outer sleeve 189 has an outer sleeve first end 186 and an outer sleeve second end 187. A flange 185 is coupled to outer spring first end 186.

Locking pin inner shaft 191 and spring 199 are positioned inside outer sleeve 189, with outer sleeve 189 slidingly coupled to locking pin inner shaft 191. Spring 199 biases locking pin inner shaft 191 with T-handle 192 against flange 185 at outer sleeve first end 186 and with inner shaft second end 194 and threaded section 198 maximally extended out outer sleeve second end 187.

Outer sleeve 189 is extended through and coupled to upper support rod 130, which couples first locking pin 190 to upper support rod 130. Inner shaft 191 slides in and out of outer sleeve 189, biased by spring 199. When multipurpose swing rod 311 is in multipurpose swing arm assembly stored position 315, with multipurpose swing rod 311 adjacent and parallel to upper support rod 130, inner shaft second end 194, and threaded section 198, reciprocatably extend into and out of a threaded hole in multipurpose swing rod 311, see FIG. 13. Spring 199 biases inner shaft second end 194 into multipurpose swing rod 311. Threading threaded section 198 into the threaded hole in multipurpose swing rod 311 couples multipurpose swing rod 311 to upper support rod 130 in multipurpose swing arm assembly stored position 315, see FIG. 4 and FIG. 13. With multipurpose swing rod 311 locked to upper support rod 130 in multipurpose swing arm assembly stored position 315, multipurpose swing arm assembly 310 is locked in a position for vehicle 102 to travel, as shown in FIG. 1. In order to access the rear of vehicle 102, or to access spare tire 218 or spare fuel tank 232, inner shaft second end 194 and threaded section 198 are unthreaded from multipurpose swing rod 311, and locking pin inner shaft 191 is pulled out of multipurpose swing rod 311 using T-handle 192. This releases multipurpose swing rod 311 from upper support rod 130 and multipurpose swing arm assembly stored position 315, and allows multipurpose swing rod 311 to swing out to open position 216 as shown in FIG. 2.

Second locking pin 195 is the same as first locking pin 190, with the same description, except second locking pin 195 reciprocatably extends into and out of tire holder swing rod 211 from upper support rod 130 to lock tire holder swing rod 211 in tire holder swing arm assembly stored position 255, see FIG. 4. With multipurpose swing arm assembly 310 and tire holder swing arm assembly 210 locked in stored positions 315 and 255, vehicle 102 can travel down the road.

Figure 14:
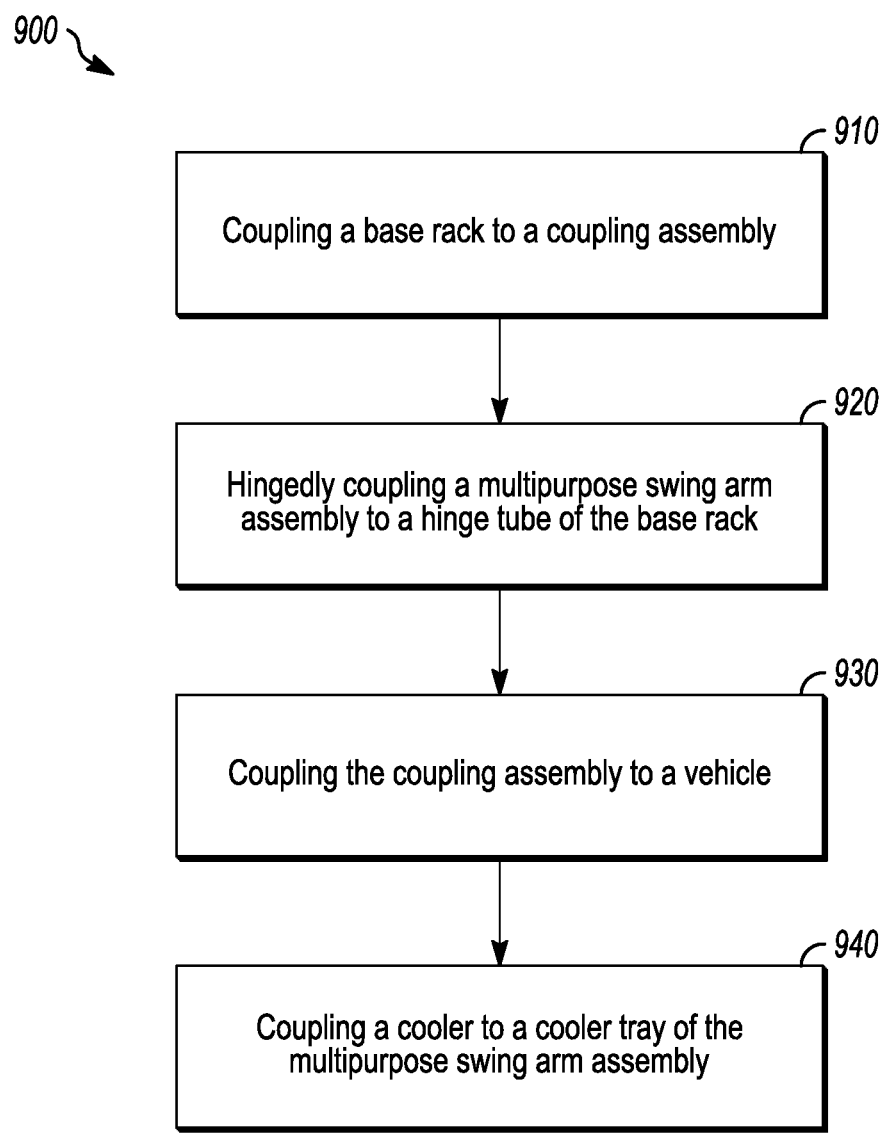
FIG. 14 illustrates a method of coupling a cooler to a vehicle.

FIG. 14 illustrates method 900 of coupling a cooler to a vehicle. Method 900 includes an act 910 of coupling a base rack to a coupling assembly. The base rack includes an upper support rod and a hinge tube coupled to the upper support rod. The upper support rod has an upper rod first end, an upper rod second end and an upper rod longitudinal axis. The upper rod longitudinal axis is parallel to a bumper longitudinal axis of the vehicle. The hinge tube is coupled to the upper support rod first end.

Method 900 also includes an act 920 of hingedly coupling a multipurpose swing arm assembly to the hinge tube. The multipurpose swing arm assembly includes a multipurpose swing rod, a first and a second cooler tray support rod, and a cooler tray coupled to the first and the second cooler tray support rods.

The multipurpose swing rod has a multipurpose swing rod first end removably and rotatably coupled to the hinge tube, a multipurpose swing rod second end opposing the multipurpose swing rod first end, and a multipurpose swing rod longitudinal axis.

The first cooler tray support rod is coupled to the multipurpose swing rod. The first cooler tray support rod has a first cooler tray support rod first end coupled to the multipurpose swing rod, a first cooler tray support rod second end opposing the first cooler tray support rod first end, and a first cooler tray support rod longitudinal axis. The first cooler tray support rod longitudinal axis is perpendicular to the multipurpose swing rod longitudinal axis.

The second cooler tray support rod is coupled to the multipurpose swing rod. The second cooler tray support rod has a second cooler tray support rod first end coupled to the multipurpose swing rod, a second cooler tray support rod second end opposing the second cooler tray support rod first end, and a second cooler tray support rod longitudinal axis. The second cooler tray support rod longitudinal axis is perpendicular to the multipurpose swing rod longitudinal axis.

The cooler tray is coupled to the first and the second cooler tray support rods. The cooler tray includes a cooler tray flat plate of rigid material.

Method 900 includes an act 930 of coupling the coupling assembly to the vehicle. Coupling the coupling assembly to the vehicle couples the base rack and the multipurpose swing arm assembly to the vehicle. The coupling assembly includes a receiver tube, a receiver wedge tube, and a tightening bolt. The receiver tube is an elongate hollow tube with a rounded rectangular shaped transverse cross-section. The receiver tube is coupled to the base rack. The receiver tube is coupled to a hitch receiver of the vehicle. The receiver wedge tube is a hollow tube with a rounded rectangular shaped transverse cross section. The tightening bolt is a bolt that couples the receiver wedge tube to the receiver tube.

Method 900 also includes an act 940 of coupling a cooler to the cooler tray. With the cooler coupled to the cooler tray, the cooler can be transported with the vehicle.

Method 900 can include many other acts. In some embodiments, method 900 includes coupling a work top bar to the multipurpose swing rod. The work top bar includes a work top bar first end hingedly coupled to the multipurpose swing rod, a work top bar second end hingedly coupled to the multipurpose swing rod, a work top bar first bend, a work top bar first end section extending from the work top bar first end to the work top bar first bend, a work top bar second bend, a work top bar center section extending from the work top bar first bend to the work top bar second bend, and a work top bar second end section extending from the work top bar second bend to the work top bar second end. The work top bar center section is parallel to the multipurpose swing rod longitudinal axis. In some embodiments, method 900 includes coupling a work top to the work top bar, where the work top includes a work top flat plate of rigid material. In some embodiments, method 900 includes coupling a fluid storage container to a work top bottom surface of the work top flat plate.

A multipurpose swing arm assembly for a vehicle accessory rack, and an accessory rack for a vehicle that includes the multipurpose swing arm assembly, have been described. The accessory rack is coupled to a vehicle and includes a base rack that holds the multipurpose swing arm assembly, and a coupling assembly that couples the base rack and the multipurpose swing arm assembly to the hitch coupler of the vehicle. The multipurpose swing arm assembly is used to hold accessories that are desired to be transported and used with the vehicle. The multipurpose swing arm assembly includes a multipurpose swing rod hingedly coupled to the base rack, and two cooler tray support rods. A cooler tray is coupled to the cooler tray support rods. A cooler is set on the cooler tray and coupled to the multipurpose swing arm assembly to be transported and used with the vehicle. A work top bar and a work top can also be coupled to the multipurpose swing rod to be used as a table top. A tire holder swing arm assembly can also be coupled to the base rack to carry a spare tire with the vehicle. The multipurpose swing arm assembly and the tire rack swing arm assembly are both hingedly coupled to the base rack so they can swing away from the vehicle from the middle, allowing access to the rear of the vehicle, and putting accessories like the work top in a position to be used while the vehicle is parked. The multipurpose swing arm assembly and the tire rack swing arm assembly are removable and reconfigurable to make the accessory rack usable for many different needs.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. An accessory rack for a vehicle, the accessory rack comprising:
   a base rack comprising:
      an upper support rod having an upper rod first end, an upper rod second end and an upper rod longitudinal axis; and
      a hinge tube coupled to the upper rod first end, wherein the hinge tube has a hinge tube longitudinal axis;
   a coupling assembly coupled to the upper support rod, wherein the coupling assembly is configured to couple the base rack to the vehicle; and
   a multipurpose swing arm assembly removably and rotatably coupled to the hinge tube,
      wherein the multipurpose swing arm assembly comprises:
      a multipurpose swing rod having a multipurpose swing rod first end coupled to the hinge tube, a multipurpose swing rod second end opposing the multipurpose swing rod first end, and a multipurpose swing rod longitudinal axis;
      a first cooler tray support rod coupled to the multipurpose swing rod;
      a second cooler tray support rod coupled to the multipurpose swing rod, wherein the first and the second cooler tray support rods lie in a cooler tray support rod plane, and wherein the first and second cooler tray support rods are both perpendicular to the multipurpose swing rod longitudinal axis; and
      a cooler tray coupled to the first and the second cooler tray support rods, wherein the cooler tray comprises a cooler tray flat plate of rigid material with a lip along a flat plate perimeter of the cooler tray flat plate.

2. The accessory rack of claim 1, wherein the multipurpose swing arm assembly further comprises:
   a work top bar hingedly coupled to the multipurpose swing rod, wherein the work top bar comprises:
      a work top bar first end hingedly coupled to the multipurpose swing rod;
      a work top bar second end hingedly coupled to the multipurpose swing rod;
      a work top bar first bend;
      a work top bar first end section extending from the work top bar first end to the work top bar first bend;
      a work top bar second bend;

a work top bar center section extending from the work top bar first bend to the work top bar second bend, wherein the work top bar center section is parallel to the multipurpose swing rod longitudinal axis; and a work top bar second end section extending from the work top bar second bend to the work top bar second end; and a work top coupled to the work top bar, wherein the work top comprises a work top flat plate of rigid material.

3. The accessory rack of claim 2, wherein the multipurpose swing arm assembly further comprises:

a tire mount extension bar coupled to the work top bar center section, wherein the tire mount extension bar is perpendicular to the work top bar center section; and a tie loop coupled to an end of the tire mount extension bar.

4. The accessory rack of claim 2, further comprising at least one fluid storage container coupled to a work top bottom surface of the work top flat plate.

5. The accessory rack of claim 1, wherein the hinge tube is a first hinge tube, and wherein the accessory rack further comprises:

a second hinge tube coupled to the upper rod second end; and a tire holder swing arm assembly removably and rotatably coupled to the second hinge tube, wherein the tire holder swing arm assembly comprises:

a tire holder swing rod having a tire holder swing rod first end, a tire holder swing rod second end opposing the tire holder swing rod first end, and a tire holder swing rod longitudinal axis, wherein the tire holder swing rod first end is removably and hingedly coupled to the second hinge tube;

a first tire holder support rod coupled to the tire holder swing rod;

a second tire holder support rod coupled to the tire holder swing rod, wherein the first and the second tire holder support rods lie in a tire holder support rod plane;

a tire holder bar coupled to the tire holder swing rod, wherein the tire holder bar defines a tire holder bar plane that is perpendicular to the tire holder support rod plane; and a fuel tank coupler coupled to the tire holder bar.

6. The accessory rack of claim 5, wherein the tire holder bar comprises:

a tire holder bar first end coupled to the tire holder swing rod;

a tire holder bar second end coupled to the tire holder swing rod;

a tire holder bar bend in the tire holder bar, wherein the tire holder bar bend is between the tire holder bar first end and the tire holder bar second end, and wherein the tire holder bar bend has a tire holder bar bend angle of between about 35 degrees and about 40 degrees; and a hammock mount coupled to the tire holder bar, wherein the hammock mount is a hollow tube.

7. The accessory rack of claim 5, further comprising:

a first locking pin, wherein the first locking pin is spring loaded, is coupled to and extends through the upper support rod, and reciprocatably extends into the multipurpose swing rod to lock the multipurpose swing arm assembly in a multipurpose swing arm assembly stored position; and a second locking pin, wherein the second locking pin is spring loaded, is coupled to and extends through the upper support rod, and reciprocatably extends into the tire holder swing rod to lock the tire holder swing arm assembly in a tire holder swing arm assembly stored position.

8. The accessory rack of claim 5, wherein the upper rod longitudinal axis is perpendicular to a first hinge tube longitudinal axis of the first hinge tube.

9. The accessory rack of claim 7, wherein the upper rod longitudinal axis is parallel to the multipurpose swing rod longitudinal axis when the multipurpose swing arm assembly is in the multipurpose swing arm assembly stored position.

10. The accessory rack of claim 1, wherein the coupling assembly comprises:

a receiver tube coupled to the upper support rod;

a receiver wedge tube removably coupled to the receiver tube;

a tightening bolt that couples the receiver wedge tube to the receiver tube; and an accessory hitch receiver coupled to the receiver tube;

wherein the coupling assembly couples the base rack to a hitch receiver of the vehicle.

11. A multipurpose swing arm assembly of a vehicle accessory rack, the multipurpose swing arm assembly comprising:

a multipurpose swing rod having a multipurpose swing rod first end coupled to a base rack of the vehicle accessory rack, a multipurpose swing rod second end opposing the multipurpose swing rod first end, and a multipurpose swing rod longitudinal axis;

a work top bar hingedly coupled to the multipurpose swing rod, wherein the work top bar comprises:

a work top bar first end hingedly coupled to the multipurpose swing rod;

a work top bar second end hingedly coupled to the multipurpose swing rod;

a work top bar first bend;

a work top bar first end section extending from the work top bar first end to the work top bar first bend;

a work top bar second bend;

a work top bar center section extending from the work top bar first bend to the work top bar second bend, wherein the work top bar center section is perpendicular to the to the work top bar first end section; and a work top bar second end section extending from the work top bar second bend to the work top bar second end; and a work top coupled to the work top bar, wherein the work top comprises a work top flat plate of rigid material.

12. The multipurpose swing arm assembly of claim 11, further comprising:

a first cooler tray support rod coupled to the multipurpose swing rod;

a second cooler tray support rod coupled to the multipurpose swing rod, wherein the first and second cooler tray support rods are both perpendicular to the multipurpose swing rod longitudinal axis; and a cooler tray coupled to the first and the second cooler tray support rods, wherein the cooler tray comprises a cooler tray flat plate of rigid material with a lip along a perimeter of the cooler tray flat plate.

13. The multipurpose swing arm assembly of claim 12, further comprising:

a tire mount bar coupled to the work top tube center section, wherein the tire mount bar is perpendicular to the work top tube center section; and a tie loop coupled to an end of the tire mount bar.

14. The multipurpose swing arm assembly of claim 12, wherein the work top bar lies in a work top bar plane, the first and the second cooler tray support bars lie in a cooler tray support bar plane, and a work top bar angle between the work top bar plane and the cooler tray support bar plane is adjustable between about 90 degrees to about 180 degrees.

15. The multipurpose swing arm assembly of claim 11, further comprising at least one fluid storage container coupled to a work top bottom surface of the work top flat plate.

16. The multipurpose swing arm assembly of claim 11, further comprising a bottle opener end cap coupled to the multipurpose swing rod second end.

17. The multipurpose swing arm assembly of claim 11, wherein the work top bar center section is parallel to the multipurpose swing rod longitudinal axis.

18. A method of coupling a cooler to a vehicle, the method comprising:
   coupling a base rack to a coupling assembly, wherein the base rack comprises:
      an upper support rod having an upper rod first end, an upper rod second end and an upper rod longitudinal axis, wherein the upper rod longitudinal axis is parallel to a bumper longitudinal axis of the vehicle; and
      a hinge tube coupled to the upper support rod first end;
   hingedly coupling a multipurpose swing arm assembly to the hinge tube, wherein the multipurpose swing arm assembly comprises:
      a multipurpose swing rod having a multipurpose swing rod first end removably and rotatably coupled to the hinge tube, a multipurpose swing rod second end opposing the multipurpose swing rod first end, and a multipurpose swing rod longitudinal axis;
      a first cooler tray support rod coupled to the multipurpose swing rod, wherein the first cooler tray support rod has a first cooler tray support rod first end coupled to the multipurpose swing rod, a first cooler tray support rod second end opposing the first cooler tray support rod first end, and a first cooler tray support rod longitudinal axis, wherein the first cooler tray support rod longitudinal axis is perpendicular to the multipurpose swing rod longitudinal axis;
      a second cooler tray support rod coupled to the multipurpose swing rod, wherein the second cooler tray support rod has a second cooler tray support rod first end coupled to the multipurpose swing rod, a second cooler tray support rod second end opposing the second cooler tray support rod first end, and a second cooler tray support rod longitudinal axis, wherein the second cooler tray support rod longitudinal axis is perpendicular to the multipurpose swing rod longitudinal axis; and
      a cooler tray coupled to the first and the second cooler tray support rods, wherein the cooler tray comprises a cooler tray flat plate of rigid material;
   coupling the coupling assembly to the vehicle, wherein the coupling assembly comprises:
      a receiver tube, wherein the receiver tube is an elongate hollow tube with a rounded rectangular shaped transverse cross-section, and wherein the receiver tube is coupled to the base rack, and wherein the receiver tube is coupled to a hitch receiver of the vehicle;
      a receiver wedge tube, wherein the receiver wedge tube is a hollow tube with a rounded rectangular shaped transverse cross section; and
      a tightening bolt that couples the receiver wedge tube to the receiver tube; and
   coupling a cooler to the cooler tray.

19. The method of claim 18, further comprising:
   coupling a work top bar to the multipurpose swing rod, wherein the work top bar comprises:
      a work top bar first end hingedly coupled to the multipurpose swing rod;
      a work top bar second end hingedly coupled to the multipurpose swing rod;
      a work top bar first bend;
      a work top bar first end section extending from the work top bar first end to the work top bar first bend;
      a work top bar second bend;
      a work top bar center section extending from the work top bar first bend to the work top bar second bend, wherein the work top bar center section is parallel to the multipurpose swing rod longitudinal axis; and
      a work top bar second end section extending from the work top bar second bend to the work top bar second end; and
   coupling a work top to the work top bar, wherein the work top comprises a work top flat plate of rigid material.

20. The method of claim 19, further comprising coupling a fluid storage container to a work top bottom surface of the work top flat plate.

* * * * *